United States Patent
Vijayakumar et al.

(10) Patent No.: US 7,095,421 B2
(45) Date of Patent: *Aug. 22, 2006

(54) SELECTIVE SUPER-SAMPLING/ADAPTIVE ANTI-ALIASING OF COMPLEX 3D DATA

(75) Inventors: Baskaran Vijayakumar, Mountain View, CA (US); Konstantine I. Iourcha, San Jose, CA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,832

(22) Filed: Oct. 18, 2004
(Under 37 CFR 1.47)

(65) Prior Publication Data
US 2005/0179698 A1  Aug. 18, 2005

Related U.S. Application Data

(63) Continuation of application No. 09/855,280, filed on May 14, 2001, now Pat. No. 6,828,983.

(60) Provisional application No. 60/204,213, filed on May 12, 2000.

(51) Int. Cl.
*G09G 5/00* (2006.01)
*G06K 9/40* (2006.01)

(52) U.S. Cl. ........... 345/613; 345/611; 345/587; 345/545; 382/269

(58) Field of Classification Search ........ 345/611–614, 345/618; 382/266–269, 254, 275
See application file for complete search history.

(56) References Cited

U.S. PATENT DOCUMENTS

| | | | |
|---|---|---|---|
| 4,343,037 A | 8/1982 | Bolton | |
| 5,347,618 A | 9/1994 | Akeley | |
| 5,461,706 A * | 10/1995 | Trow et al. | 345/585 |
| 5,471,568 A | 11/1995 | Webb et al. | |
| 5,511,153 A | 4/1996 | Azarbayejani et al. | |
| 5,734,386 A | 3/1998 | Cosman | |
| 5,740,343 A | 4/1998 | Tarolli et al. | |
| 5,831,624 A | 11/1998 | Tarolli et al. | |
| 6,005,582 A | 12/1999 | Gabriel et al. | |
| 6,016,152 A | 1/2000 | Dickie | |
| 6,064,393 A | 5/2000 | Lengyel et al. | |
| 6,128,000 A | 10/2000 | Jouppi et al. | |
| 6,281,903 B1 | 8/2001 | Martin et al. | |
| 6,292,193 B1 | 9/2001 | Perry et al. | |
| 6,304,286 B1 | 10/2001 | Shirai et al. | |
| 6,317,525 B1 | 11/2001 | Aleksic et al. | |

(Continued)

FOREIGN PATENT DOCUMENTS

GB  2 254 750 A  * 10/1992

OTHER PUBLICATIONS

Two-pass Anti-aliasing in Constructive Solid Rendering IBM Technical Disclosure Bulletin, Jan. 1, 1990, pp. 278-279, vol. No. 32, Issue No. 8B.*

(Continued)

*Primary Examiner*—Wesner Sajous
(74) *Attorney, Agent, or Firm*—Carr & Ferrell LLP

(57) ABSTRACT

A system and method is provided for preventing the occurrence of aliasing at the edges of polygons in 3D graphics. The system may detect both polygon geometric edges and Z edges due to intersection of multiple polygons. In one embodiment, the system includes an edge anti-aliasing module configured to selectively super-sample edge portions of primitives. The system further includes a coarse memory for storing information of pixels that are not super-sampled and a fine memory for storing information of pixels that are super-sampled by the edge anti-aliasing module.

19 Claims, 18 Drawing Sheets

U.S. PATENT DOCUMENTS

| | | | |
|---|---|---|---|
| 6,359,619 | B1 | 3/2002 | Waters et al. |
| 6,377,273 | B1 | 4/2002 | Lee et al. |
| 6,400,370 | B1 | 6/2002 | Lee et al. |
| 6,466,206 | B1 | 10/2002 | Deering |
| 6,489,966 | B1 | 12/2002 | Kanzaki et al. |
| 6,509,897 | B1 | 1/2003 | Lewis |
| 6,570,579 | B1 | 5/2003 | MacInnis et al. |
| 6,766,281 | B1 * | 7/2004 | Vijayakumar et al. ...... 702/190 |
| 6,870,564 | B1 * | 3/2005 | Burns .......................... 348/263 |
| 2005/0007379 | A1 | 1/2005 | Vijayakumar et al. |

OTHER PUBLICATIONS

Andreas Shilling, "A New Simple and Efficient Antialiasing with Subpixel Masks", Jul. 1991, pp. 133-141.

Norman P. Jouppi, Chun-Fa Chang, "Z3: An Economical Hardware Technique for High-Quality Antialiasing and Transparency", 1999, pp. 85-93, Eurographics Los Angeles California.

Jay Torborg, James T. Kajiya, "Talisman: Commodity Realtime 3D Graphics for the PC", Microsoft Corporation.

Loren Carpenter, "The A-buffer, an Antialiased Hidden Surface Method", Computer Graphics, Jul. 1984, pp. 13-18, vol. 18, No. 3, Association for Computing Machinery, Inc.

McCormack et al., "Feline: Fast Elliptical Lines for Anisotropic Texture Mapping," Computer Graphics Proceedings, Annual Conference 1999, pp. 243-249.

Programming Assignment No. 5; Beier-Neely Morphing; http://www.cs.rochester.edu/u/www/u/kyros/Courses/CS290B/Assigns/assign5.html; Nov. 22, 2002.

Mueller, Carl, "Mipmapping," http://www.ping.be/powervr/anisotropic2.htm, date unknown.

Author Unknown, "Anisotropic Filtering Explained," http://www.ping.be/powervr/anisotropic.htm, date unknown.

* cited by examiner $f(x,y) \sim [f_1 \, f_2 \, f_3]$

SELECTIVE SUPER-SAMPLING/ADAPTIVE ANTI-ALIASING OF COMPLEX 3D DATA

CROSS-REFERENCE TO RELATED APPLICATIONS

This application is a continuation application and claims the priority benefit of U.S. patent application Ser. No. 09/855,280, filed May 14, 2001, entitled "Selective Super-Sampling/Adaptive Anti-Aliasing of Complex 3D Data" and now U.S. Pat. No. 6,828,983; U.S. Pat. No. 6,828,983 claims the priority benefit of U.S. provisional patent application No. 60/204,213, filed on May 12, 2000, entitled "Selective Super-Sampling/Adaptive Anti-Aliasing of Complex 3D Data." This application is related to U.S. patent application Ser. No. 09/855,322, filed on May 14, 2001, entitled "A Matched Texture Filter Design for Rendering Multi-Rate Data Samples" and now U.S. Pat. No. 6,766,281. This application is also related to U.S. patent application Ser. No. 10/855,885, filed May 26, 2004, entitled "Matched Texture Filter Design for Rendering Multi-Rate Data Samples." The disclosures of all of these applications are incorporated herein by reference.

BACKGROUND OF THE INVENTION

1. Field of the Invention

The present invention relates generally to 3D graphics and sampling/antialiasing techniques and more particularly to a system and method for efficiently sampling 3D primitives while minimizing the aliasing artifacts that are caused by sampling.

2. Description of Related Art

The problem of aliasing typically occurs when a continuous signal is represented in a discrete form (commonly referred to as sampling). In the context of 3D graphics, a continuous object (such as a polygon) is represented by a collection of discrete points (pixels) on a display screen. If the sampling is not carefully performed, aliasing artifacts may significantly corrupt the rendered scene. Aliasing artifacts include "jaggies" or "staircasing" that normally appear on the edges of the primitives. The staircase effect becomes more prominent in animations, since the staircase effect tends to creep in the animation images.

The process of eliminating aliasing artifacts is broadly referred to as anti-aliasing. One common anti-aliasing mechanism is referred to as A-buffer (anti-aliased, area-averaged, accumulation buffer) in which polygon edge fragments are sampled, and the information about the fragments are stored as linked lists and blended for antialiasing. However, a disadvantage of the A-buffer algorithm is that this algorithm assumes use of an unbounded memory for storing data such as edge fragment information for complex 3D scenes (scenes with high complexity and/or with a large number of primitives). To simplify the memory requirements in the A-buffer algorithm, heuristics may be used. However, the use of heuristics degrades the quality of the output image. A further disadvantage of the A-buffer algorithm is that it does not detect "Z-edges", thus resulting in color bleeding problems due to improper Z interpolation.

Another method of anti-aliasing involves an architecture which divides each image layer into pixel regions or "chunks", and the geometry is presorted into bins based upon the particular chunk (or chunks) in which the geometry will be rendered. Each chuck is dealt with independently for anti-aliasing. However, the anti-alasing algorithm used in this architecture is based upon the A-buffer algorithm, and therefore, suffers from the same disadvantages and drawbacks mentioned previously.

A further anti-aliasing method is known as $Z^3$, which maintains a sorted list of edge fragments and blends the fragments in the same manner as the A-buffer algorithm. Although the $Z^3$ algorithm can detect "Z-edges", it disadvantageously relies on unbounded memory, use of linked lists which require complex logic, and blending of polygon edge fragments to reduce memory usage which degrades the quality of the output image for a complex 3D scene.

Therefore, there is a need for an improved system and method for efficiently sampling 3D primitives while preventing the aliasing artifacts introduced by the sampling process.

SUMMARY OF THE INVENTION

The present system and method prevents the occurrence of aliasing at the edges of polygons in 3D graphics scenes. Advantageously, the anti-aliasing of edges may occur in real time, and the system may also detect both polygon "geometry edges" and "Z edges" that occur due to the interaction of multiple polygons. Relevant edge information may be stored in a limited (or bounded) memory space during anti-aliasing operations, irrespective of the complexity of the 3D scene. Further, the present system and method may permit significant reduction in memory traffic, leading to a reduced latency and increased rendering speed, since super-sampling need be performed only at the edges of primitives. In an embodiment of the present system and method, selective super-sampling of a pixel is deferred until more than one primitive edge is detected to fall in the pixel. The system and method may also prevent the occurrence of aliasing artifacts and permit high quality images to be generated. In another embodiment, the present system and method prevents aliasing at an edge of a primitive by detecting "geometry edges" of a current primitive, detecting "Z edges" formed by the intersection of the current primitive and a previously rendered primitive, and super-sampling the detected edges.

A super-sampling system for preventing aliasing in 3D data is provided in accordance with various embodiments. In one embodiment, the super-sampling system includes an edge anti-aliasing module configured to selectively super-sample edge portions of a primitive. The super-sampling system also includes two different memory configurations (i.e., a coarse memory and a fine memory). The coarse memory is configured to store information of pixels that are not super-sampled, while the fine memory is configured to store information of pixels that are super-sampled by the edge anti-aliasing module.

The present system and method selectively super-samples the edges generated by individual primitives as well as by the interaction of primitives. Such a selective approach reduces the memory storage requirements and traffic.

DESCRIPTION OF A PREFERRED EMBODIMENT

Figure 1:
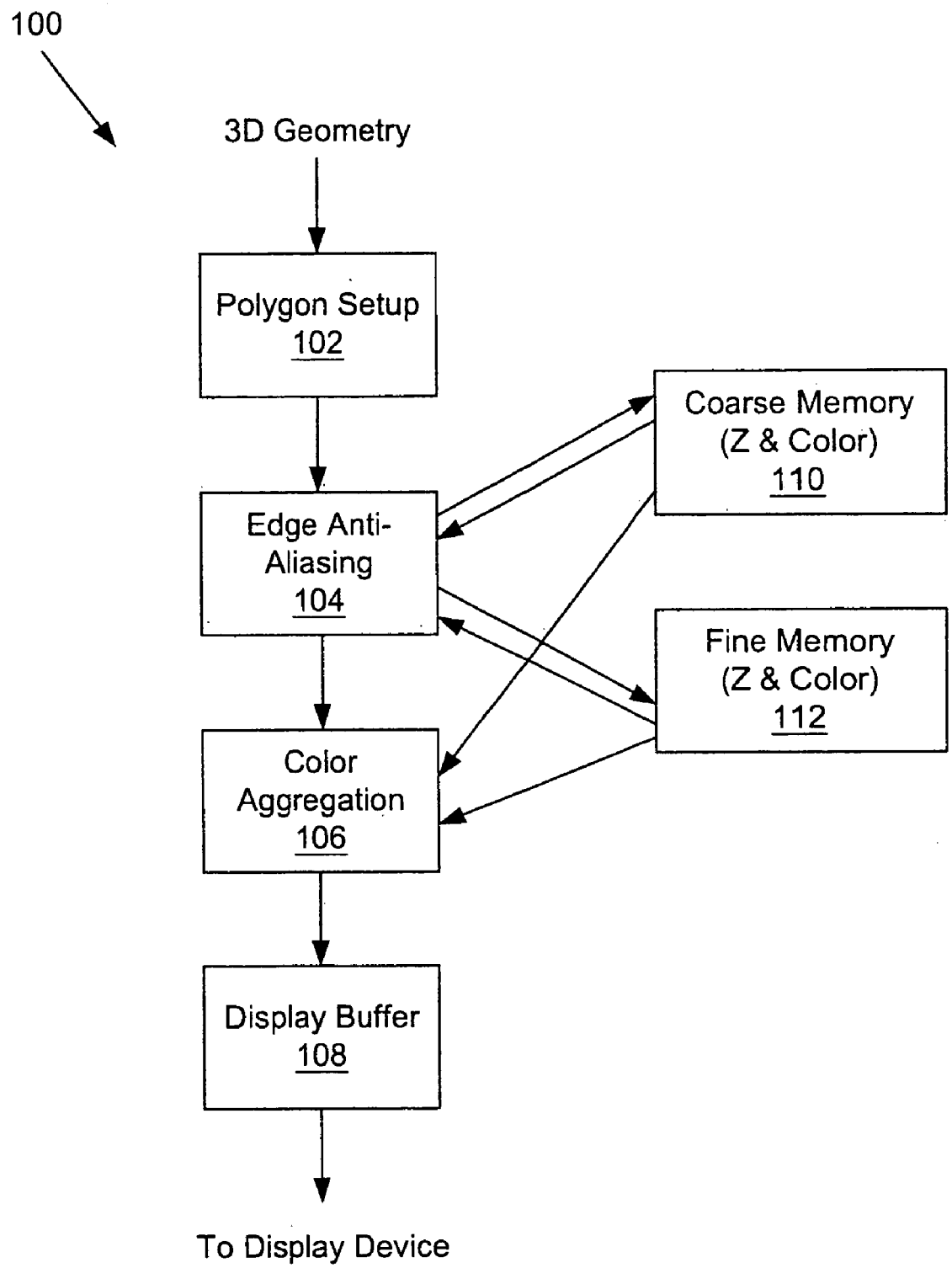
FIG. 1 is a schematic block diagram of a selective super-sampling system, according to the present system and method.
Figure 10:
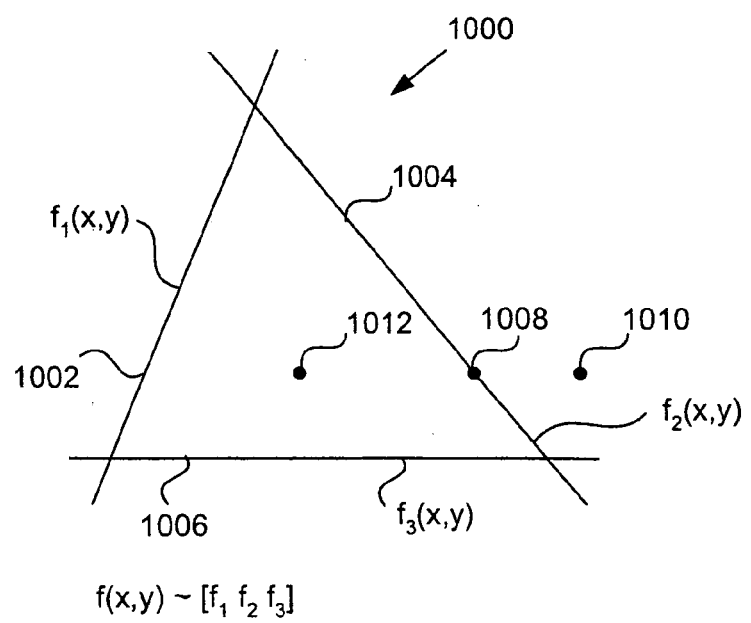
FIG. 10 is a diagram describing the edge function of a primitive.

FIG. 1 illustrates a selective super-sampling system 100 according to one embodiment of the present system and method. The super-sampling system 100 is typically implemented in a graphics system in a computer or similar processing device. The super-sampling system 100 includes a polygon setup stage 102 (typically a triangle setup stage), edge anti-aliasing module 104, color aggregation stage 106, display buffer 108, coarse memory 110 and fine memory 112. The functions of the polygon setup stage 102 include receiving 3D geometry elements (e.g., triangles or other graphic primitives) and processing the data describing the size, shape, position and other relevant characteristics of the graphics primitives. The primitives may be defined in three-dimensions using Euclidian coordinates or in four dimensions using homogenous coordinates, and projected onto a two-dimensional plane by a known algorithm. In some cases, the polygon setup stage 102 is also capable of generating an edge function as shown in FIG. 10.

The edge anti-aliasing module 104 detects edges in a primitive and selectively super-samples (over-samples) the detected edge pixels. This selective procedure leads to reduced memory storage requirements and memory traffic when compared to conventional full scene super-sampling approaches. The edge anti-aliasing module 104 operates with the coarse memory buffer 110 for storing Z-values and color values for pixels that are not super-sampled. Additionally, the edge anti-aliasing module 104 operates with the fine memory buffer 112 for storing Z-values and color values for pixels that are super-sampled. In an embodiment described in more detail below, the selective super-sampling of a pixel is deferred until more than one primitive edge is detected to fall in the pixel.

The color aggregation stage 106 performs color aggregation either by a linear combination or by more complex non-linear filtering techniques.

The display buffer 108 is typically implemented in an area of random access memory (RAM) that may be optimized for video storage. Individual memory locations in the display buffer 108 correspond to defined points on a display device for displaying the graphic images.

Figure 2:
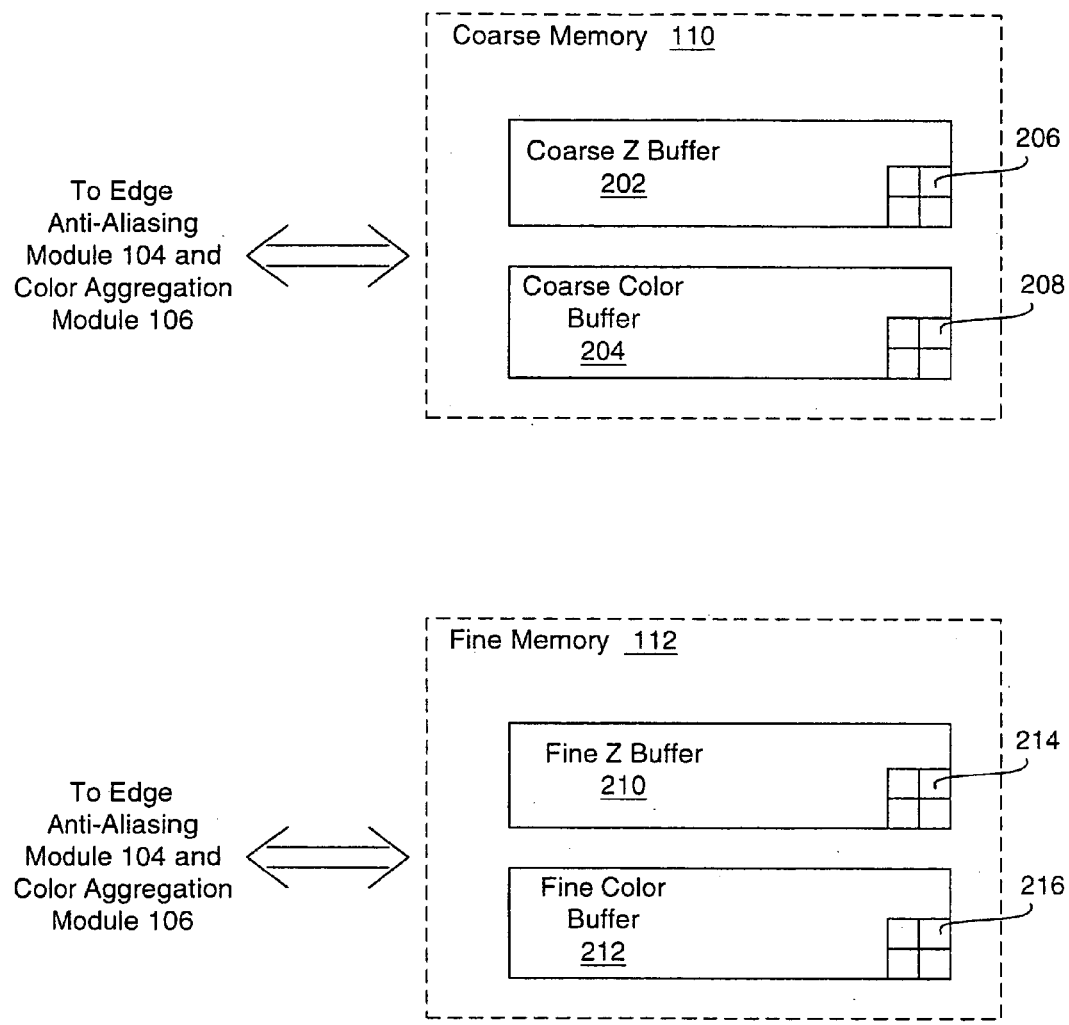
FIG. 2 is a block diagram illustrating additional details of the coarse memory and fine memory of FIG. 1.

FIG. 2 illustrates in detail, the coarse memory 110 and fine memory 112 of FIG. 1. The coarse memory 110 includes a coarse Z buffer 202 for storing Z values and a coarse color buffer 204 for storing color values of pixels that are not super-sampled. A coarse Z buffer storage area 206 and coarse color buffer storage area 208 are mapped to a screen of the display device. Therefore, the position of a particular pixel on the screen will correspond to particular storage areas (such as areas 206 and 208) in the coarse Z buffer 202 and the coarse color buffer 204. The size of the coarse Z buffer 202 and the coarse color buffer 204 depends on the resolution of the screen. For example, the coarse Z buffer 202 and the coarse color buffer 204 will each have a storage area of 800×600 for a screen with a resolution of 800×600.

The fine memory 112 includes a fine Z buffer 210 for storing Z values and a fine color buffer 212 for storing color values of sub-pixels during super-sampling operations. The size of each pixel storage area 214 in the fine Z buffer 210 depends on the resolution in which a pixel is super-sampled. The same is true for storage area 216 of the fine color buffer 212. These storage areas 214 and 216 may also be mapped to the screen of the display device.

Figure 3:
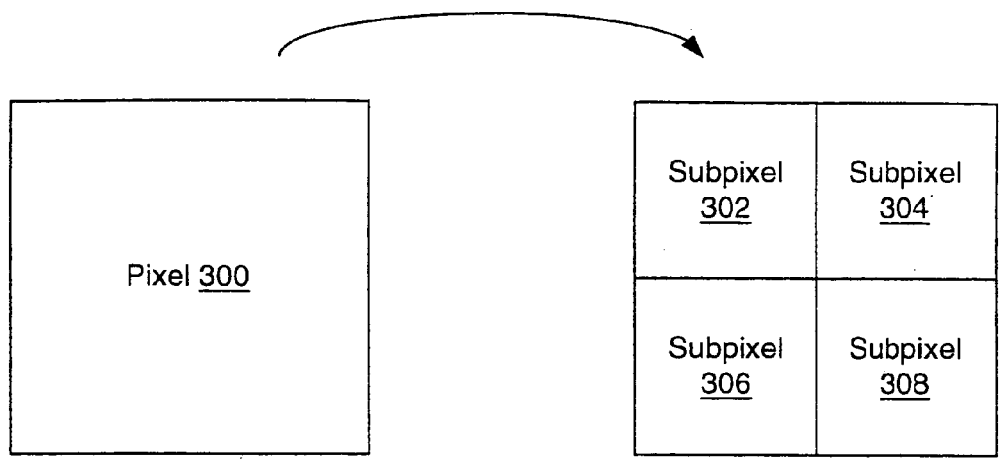
FIG. 3 is a block diagram of a pixel that is super-sampled as 2×2 sub-pixels.

Super-sampling involves sampling a scene at higher resolution than what is required during the scan conversion stage. The higher-resolution color information obtained from super-sampling is then converted into the required screen resolution by aggregation. FIG. 3 illustrates an example of super-sampling where each pixel 300 is super-sampled as 2×2 sub-pixels. An average of the color values of sub-pixels 302, 304, 306 and 308 is used to determine the color assigned to the pixel 300. Thus, each exemplary pixel storage area 214 and 216 in the fine Z buffer 210 (FIG. 2) and in the fine color buffer 212 (FIG. 2) will have a size equal to the 2×2 resolution for super-sampling.

Figure 4:
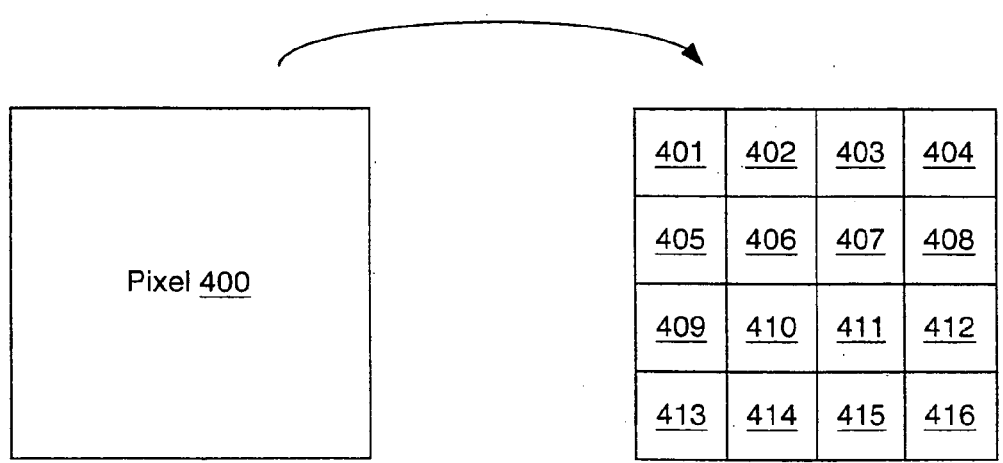
FIG. 4 is a block diagram of a pixel that is super-sampled as 4×4 sub-pixels.

A pixel 400 may also be super-sampled at a 4×4 resolution as shown in FIG. 4. The average of the color values of sub-pixels 401–416 is used to determine the color value assigned to the pixel 400. Thus, each of the exemplary pixel storage areas 214 and 216 (FIG. 2) in the fine Z buffer 210 and fine color buffer 212, respectively, will have a size equal to the 4×4 resolution for super-sampling. It should be noted that the process of down sampling from a fine color buffer resolution to a display buffer resolution can involve methods other than averaging.

Figure 5:
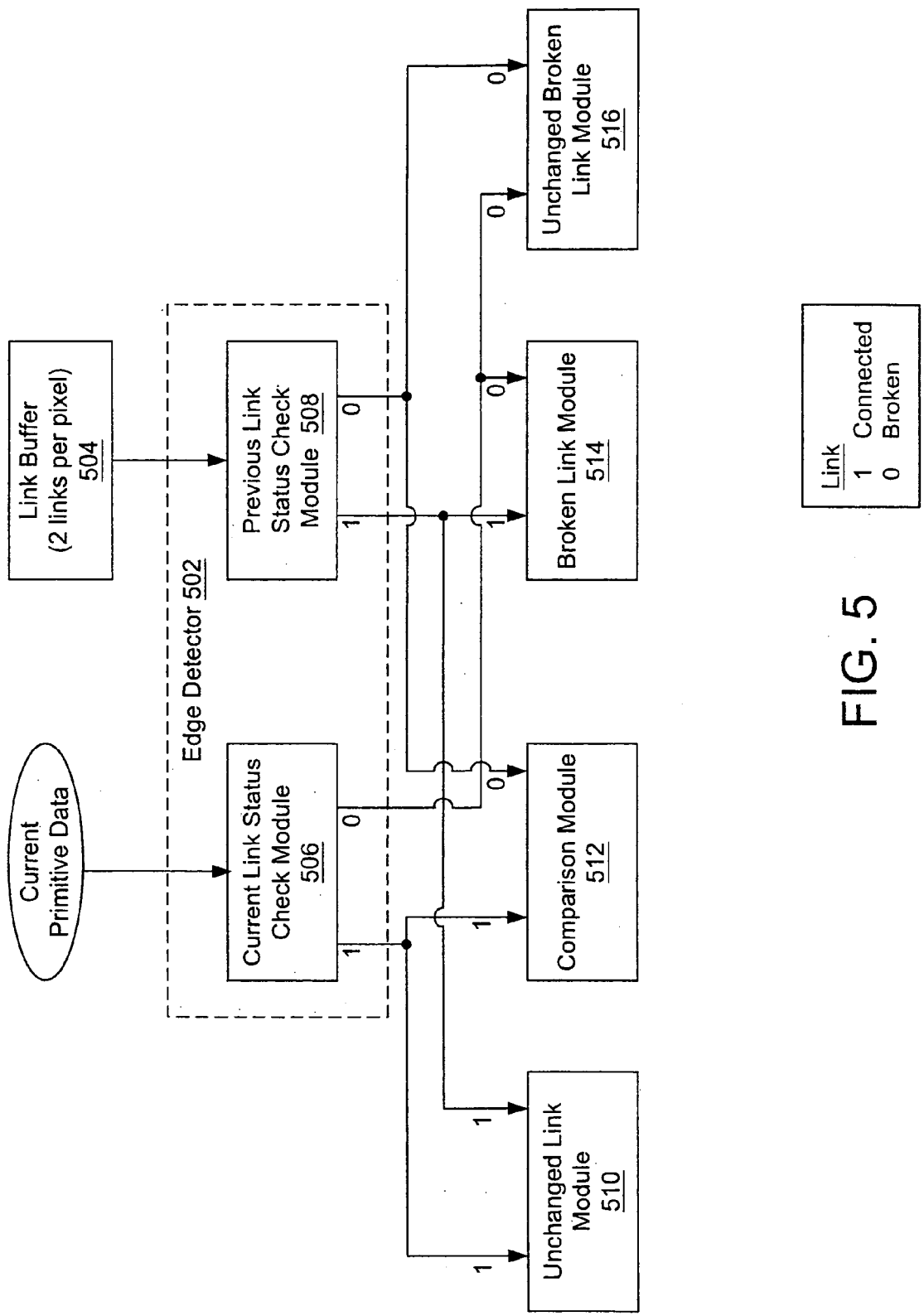
FIG. 5 is a schematic block diagram of an edge anti-aliasing module, according to the present system and method.

FIG. 5 is a schematic block diagram of one embodiment of the edge anti-aliasing module 104 (FIG. 1). The edge anti-aliasing module 104 includes an edge detector 502, unchanged link module 510, comparison module 512, broken link module 514 and unchanged broken link module 516. The edge detection module 502 detects two categories of edges known as "geometric edges" and "Z edges". "Geometric edges" are edges defined by a geometric boundary of a projected primitive or polygon, while a "Z edge" occurs when two or more polygons pass into or through each other. Detection of edges allows the subsequent identification of edge pixels that require super-sampling. The edge detector 502 further includes a current and previous link status module 506 and 508, respectively. The process of edge detection (both geometric and Z edge) is described in more detail below with reference to the various modules 506, 508, 510, 512, 514 and 516 of FIG. 5.

Figure 6:
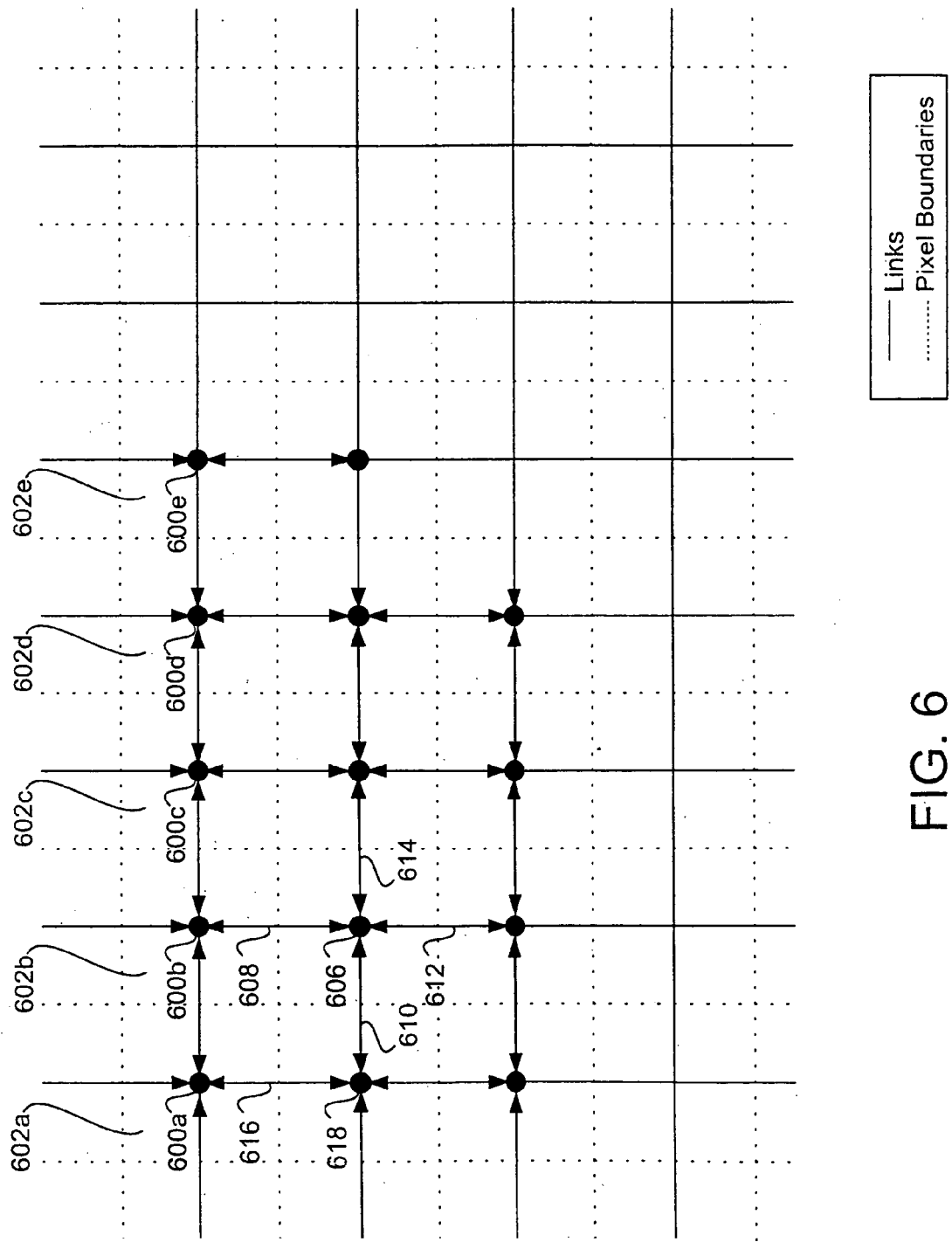
FIG. 6 is a diagram of a link grid for detecting edges of a primitive.

Connectivity information between pixels is stored in memory in the form of links as shown in FIG. 6. Dotted lines of FIG. 6 indicate pixel boundaries, while solid lines indicate the links. The edge detector module 502 (FIG. 5) defines a grid of links as shown in FIG. 6. For the purpose of this embodiment, assume that points 600a–600e are centers of pixels 602a–602e, respectively. Further, each pixel is associated with a series of links. For example, the pixel 606 is associated with and contains information relating to status of links 608, 610, 612 and 614. Other links are shown in FIG. 6 and are associated with an appropriate pixel.

Figure 7:
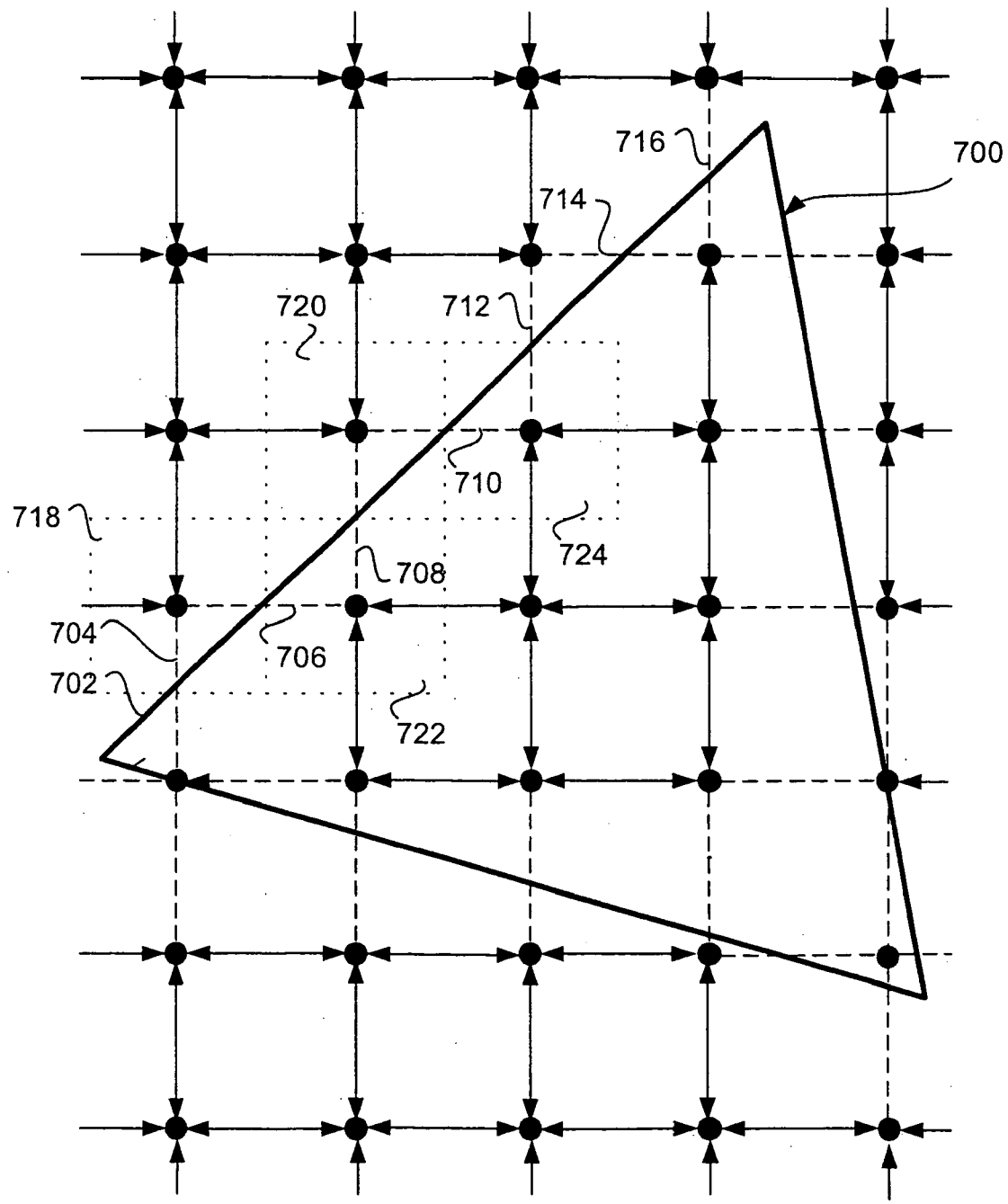
FIG. 7 is a diagram of a link grid superimposed on a primitive.

After a scene is rendered, various portions of the grid of links will be broken by primitives. Thus, if two pixels connected by a particular link straddle a polygon boundary (i.e., one of the pixels is inside the polygon and the other pixel is outside the polygon), then the link is designated as broken. As an example, FIG. 7 shows a triangle 700 breaking various links. For example, an edge 702 breaks links 704, 706, 708, 710, 712, 714 and 716. Other edges of the triangle 700 break other links as shown. The edge detection module 502 determines the location of "geometry edges" based upon the particular links that are broken by edges of a primitive. Pixels that are associated with any broken links are marked as edge pixels. Thus, pixels 718, 720, 722 and 724 are examples of edge pixels. It should be noted that when a link is broken, both pixels connected by the link are marked as edge pixels and are subsequently super-sampled. The connectivity information of links is stored in the link buffer 504 (FIG. 5). The link buffer 504 is updated if link status changes during the rendering of a primitive.

Figure 8:
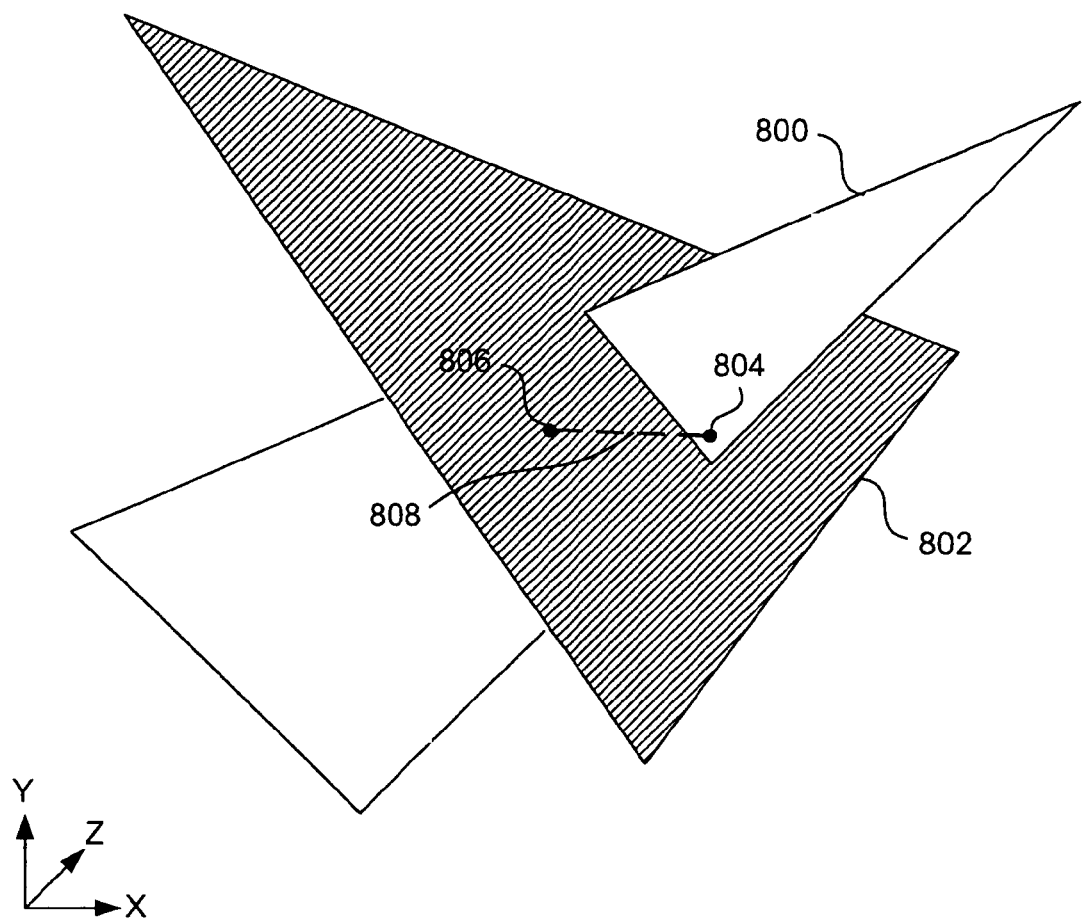
FIG. 8 is a diagram illustrating two primitives intersecting to form a "Z edge"

FIG. 8 provides an overview of a "Z edge" formed as a result of an intersection of two primitives 800 and 802. Various pixel center points will be discussed below in determining "Z edges" in accordance with an embodiment of the present system and method. For example, a "Z edge" may be detected by evaluating Z at pixel center points 804 and 806 which are both connected by link 808.

Details of Geometric Edge Detection by Use of Links

Figure 9:
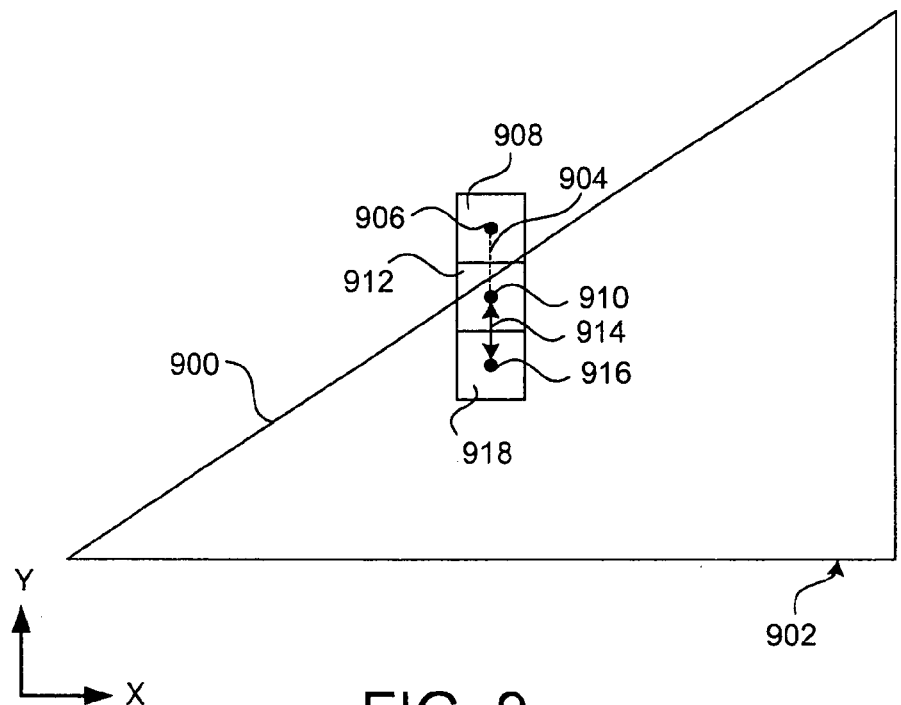
FIG. 9 is a diagram illustrating examples of links that are broken by primitive edges.

In FIG. 9, an edge 900 of primitive 902 breaks a link 904 between pixel center 906 of pixel 908 and pixel center 910 of pixel 912. The link 904 is identified as broken because pixel center 906 is outside the primitive 902 while pixel center 910 is inside the primitive 902. Because the broken link 904 is associated with pixels 908 and 912, pixels 908 and 912 are identified as edge pixels. Alternatively, a link 914 between pixel center 910 and pixel center 916 of pixel 918 is not broken by an edge of the primitive 902. Other links that are broken and not broken by the edges of the primitive 902 are contemplated, but not shown in FIG. 9.

FIG. 10 illustrates a primitive 1000 for purposes of describing a method of determining whether a pixel center falls inside or outside of the primitive 1000. As previously discussed, a link between two pixel centers is identified as broken if one pixel center is outside the primitive 1000 and the other pixel center is inside the primitive 1000. Further, a link between two pixel centers is identified as unbroken (or connected) if both pixels are on the same side of a primitive edge.

In the exemplary embodiment of FIG. 10, assume that $f_1(x,y)$, $f_2(x,y)$ and $f_3(x,y)$ are conventionally known edge functions for primitive edges 1002, 1004 and 1006, respectively, where (x,y) denote screen coordinates. Assume a function f (x,y), a conventionally known function that depends on a combination of edge functions $f_1(x,y)$, $f_2(x,y)$ and $f_3(x,y)$, is used to evaluate any pixel point (i.e., pixel center) for determining the location (i.e., inside or outside the primitive 1000) of the pixel point. If f(x,y)=0 for a particular pixel center, then that pixel center is on an edge of the primitive 1000. For example, pixel center 1008 is located on the edge 1004 and will satisfy the condition of f(x,y)=0. If f(x,y)<0 for a particular pixel center, then that pixel center is outside the primitive 1000. As shown in FIG. 10, pixel center 1010 satisfies the conditions of f(x,y)<0 since it is located outside the primitive 1000. Finally, if f(x,y)>0 for a particular pixel center, then that pixel center is inside the primitive 1000. In FIG. 10, pixel center 1012 is located inside the primitive 1000 and satisfies the function f(x,y)>0. Based on the f(x,y) values of two pixel centers, a link between the two pixel centers can be determined as broken or unbroken.

Typically, the f(x,y) information is received along with other standard vertex information when the primitive 1000 is received in the polygon setup stage 102 (FIG. 1) and edge anti-aliasing module 104 (FIG. 1) of the graphics system. However, care must be taken to define a consistent rule for edge inclusion (open/closed) when dealing with functions of f(x,y) with the properties described above.

Details of Z Edge Detection by Use of Links

Figure 11:
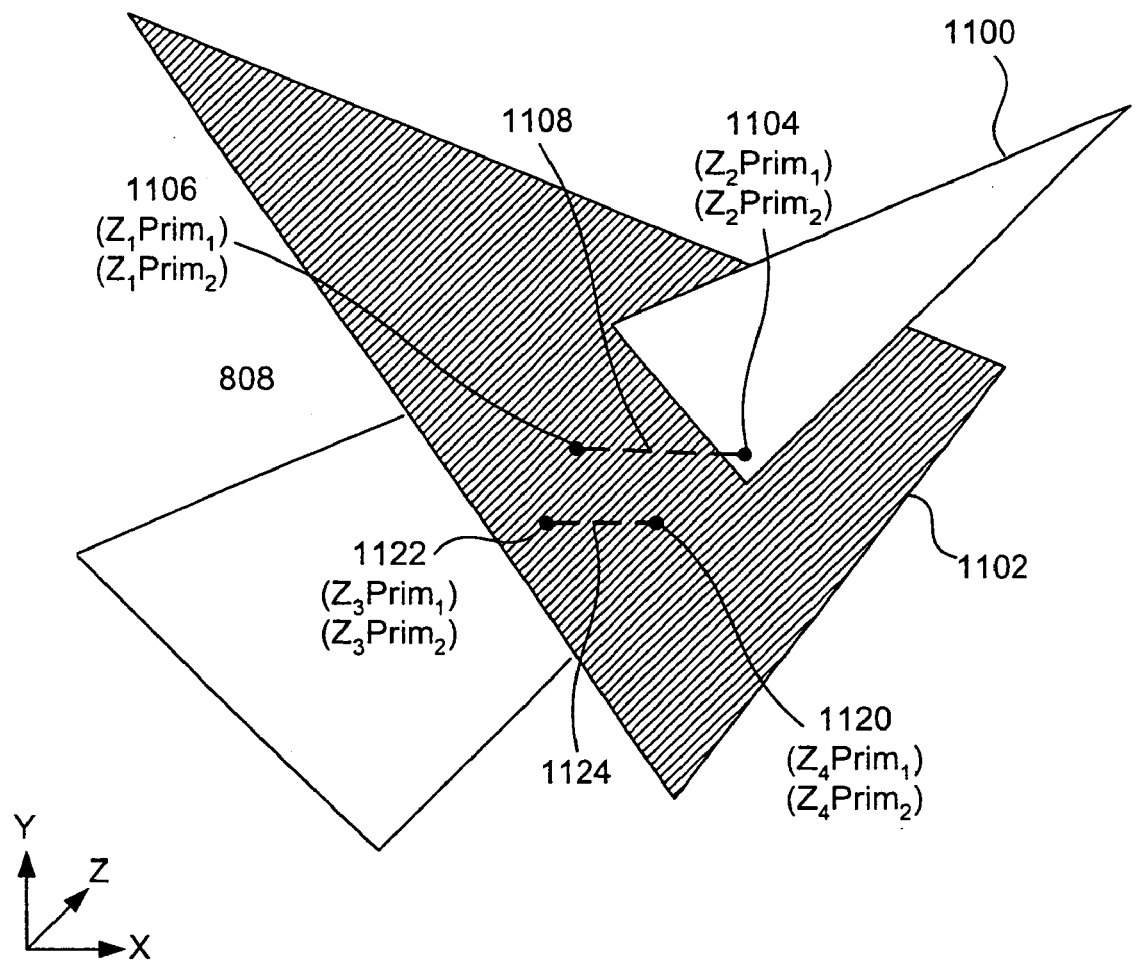
FIG. 11 is a diagram of two intersecting primitives illustrating a Z edge detection method by use of links.
Figure 12:
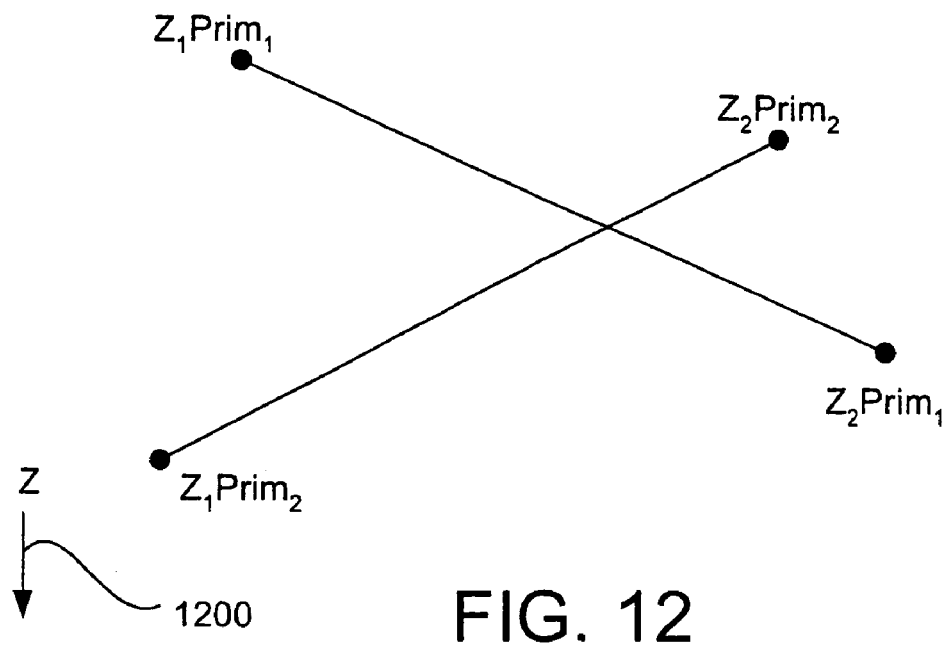
FIG. 12 is a diagram illustrating an example of Z values of two intersecting primitives when a "Z edge" is present.
Figure 13:
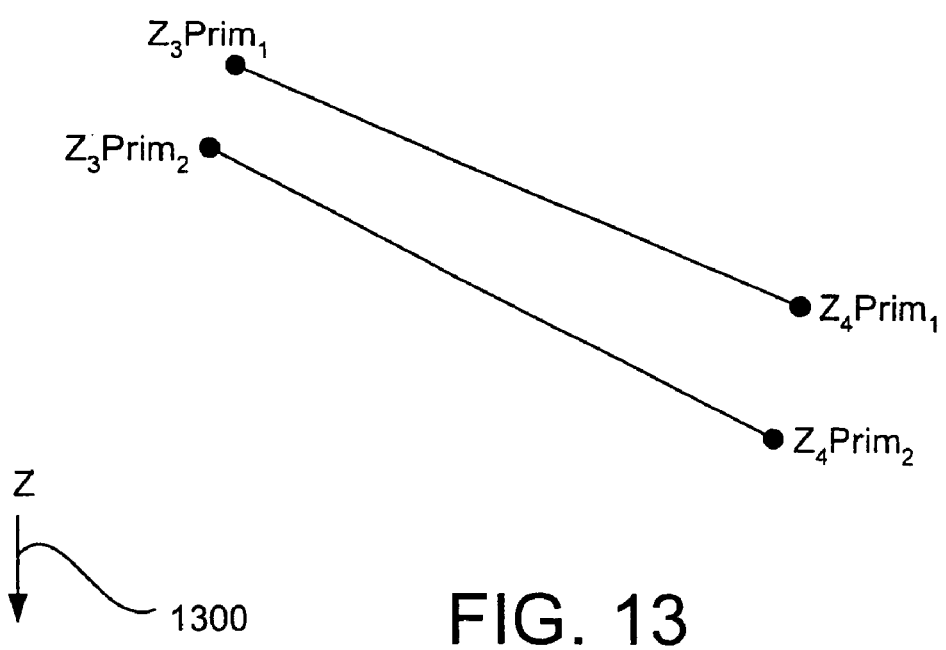
FIG. 13 is a diagram illustrating an example of Z values of two primitives when a "Z edge" is not present.

FIGS. 11–13 describe details of "Z edge" detection by use of links in accordance with the embodiment shown in FIG. 5. The Z edge detection function is performed by the edge detection module 502 (FIG. 5) for pixels that have not been classified as edge pixels. FIG. 11 illustrates two intersecting primitives 1100 and 1102. For the purpose of this exemplary embodiment, assume that at pixel center 1104, a Z value of the current primitive ($Prim_1$) 1102 is $Z_2Prim_1$ and a Z value of the buffered primitive ($Prim_2$) 1100 is $Z_2Prim_2$, while for a pixel center 1106, a Z value of the current primitive ($Prim_1$) 1102 is $Z_1Prim_1$ and a Z value of the buffered primitive ($Prim_2$) 1100 is $Z_1Prim_2$. Further assume that all links associated with pixel centers 1104 and 1106 remain connected (i.e., neither pixel at centers 1104 and 1106 have been classified as edge pixels prior to Z edge detection). In the example of FIG. 11, the Z value $Z_2Prim_2$ is closer to the screen than the Z value $Z_2Prim_1$, and the Z value $Z_1Prim_1$ is closer to the screen than the Z value $Z_1Prim_2$. A comparison is then made between the sign (positive or negative) of the value $Z_1Prim_1-Z_1Prim_2$ and the sign of the value $Z_2Prim_1-Z_2Prim_2$. the sign of the value $Z_1Prim_1-Z_1Prim_2$ is opposite to the sign of the value $Z_2Prim_1-Z_2Prim_2$, then a "Z edge" intersects the link between two particular pixel centers. For the example of FIG. 11, the value $Z_1Prim_1-Z_1Prim_2$ is negative (−) and the value $Z_2Prim_1-Z_2Prim_2$ is positive (+). Because the signs of the values are opposite, a "Z edge" occurs across a link 1108 between pixel centers 1104 and 1106.

FIG. 12 illustrates the Z values $Z_1Prim_1$ and $Z_1Prim_2$ for pixel center 1106 (FIG. 11) and the Z values $Z_2Prim_1$ and $Z_2Prim_2$ for pixel center 1104 (FIG. 11). As shown by Z axis 1200, the Z value increases vertically downwards. Thus, $Z_1Prim_1<Z_1Prim_2$ and $Z_2Prim_2<Z_2Prim_1$.

Referring back to FIG. 11, pixel centers 1120 and 1122 having a link 1224 between them is shown. At pixel center 1120, a Z value of the current primitive ($Prim_1$) 1102 is $Z_4Prim_1$ and a Z value of the buffered primitive ($Prim_2$) 1100 is $Z_4Prim_2$ while at pixel center 1122, a Z value of the first primitive ($Prim_1$) 1102 is $Z_3Prim_1$ and a Z value of the second primitive ($Prim_2$) 1100 is $Z_3Prim_2$. As described above, the proximity of the Z values relative to the screen is determined, and a comparison is then made between the sign (positive or negative) of the values. In the exemplary embodiment of FIG. 11, a comparison is made between the sign of a value $Z_3Prim_1-Z_3Prim_2$ and the sign of a value $Z_4Prim_1-Z_4Prim_2$. If the sign of the value $Z_3Prim_1-Z_3Prim_2$ is the same as the sign of the value $Z_4Prim_1-Z_4Prim_2$, then no "Z edge" intersects the link between two particular pixel centers. With regards to pixel centers 1120 and 1124, the value $Z_3Prim_1-Z_3Prim_2$ is negative (−) and the value $Z_4Prim_1-Z_4Prim_2$ is negative (−). Thus, no "Z edge" occurs across the link 1124. Alternatively, if the value $Z_3Prim_1-Z_3Prim_2$ is positive (+) and the value $Z_4Prim_1-Z_4Prim_2$ is positive (+), then no "Z edge" exists across the link 1124. It should be noted that when the difference value evaluates to zero (0) the situation is handled as a special case.

FIG. 13 illustrates the Z values $Z_3Prim_1$ and $Z_3Prim_2$ for pixel center 1122 (FIG. 11) and the Z values $Z_4Prim_1$ and $Z_4Prim_2$ for pixel center 1120 (FIG. 11). As shown by Z axis 1300, the Z value increases vertically downwards. Thus, $Z_3Prim_1<Z_3Prim_2$ and $Z_4Prim_1<Z_4Prim_2$.

Link Processing: Determine Pixels to be Sampled Based Upon Link Break

The discussion above describes the nature of links and how links can be broken by a primitive being rendered. The following discussion will present the step of super-sampling based upon the given link information. For the following discussion, a pixel is super-sampled if any of the four links associated with the pixel is broken, for example, by one primitive edge.

Figure 14:
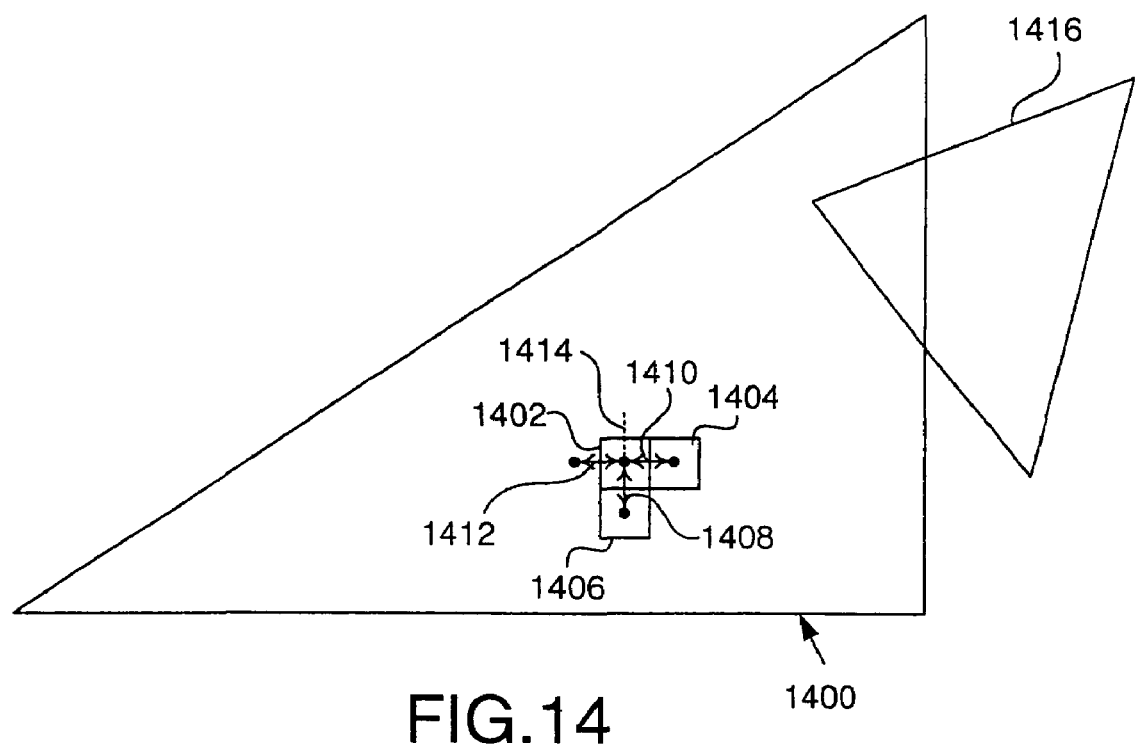
FIG. 14 is a diagram illustrating unbroken links in an interior of a primitive.

In FIG. 14 with reference to the elements of FIG. 5, the current link status check module 506 (FIG. 5) receives data for a current primitive 1400, while the previous link status check module 508 (FIG. 5) receives link information stored in the link buffer 504 (FIG. 5). The link information stored in the link buffer 504 relates to a previously rendered primitive processed by the edge detector module 502. The buffered link information also is updated as the current primitive is being rendered. The connectivity of a buffered link grid can change as primitives in the 3D scene are rendered. The edge anti-aliasing module 104 (FIG. 1) takes into account the three cases that may occur: (1) a link is broken during which an edge of the current primitive (which is unoccluded) intersects a previously broken link in the link grid; (2) a link remains broken (during which multiple edges intersect a link with one of the edges belonging to a previously rendered primitive and the other edge belonging to the current primitive; (3) a link is reconnected (during which a previously rendered edge is occluded or covered by the current primitive).

The procedure to reconnect broken links can be viewed as an optimization step in the present system and method. Leaving a link in the broken state when there is an occlusion does not compromise the functionality of the system and method. However, this optimization step facilitates the use of dynamic memory allocation of the fine Z buffer 210 (FIG. 2) and the fine color buffer 212 (FIG. 2).

FIG. 14 illustrates various non-edge pixels such as pixels 1402, 1404 and 1406 (i.e., pixels with associated links that are unbroken by an edge of the current primitive 1400). A link 1408 is formed between center points of pixels 1402 and 1406 while a link 1410 is formed between center points of pixels 1402 and 1404. The current link status module 506 detects the links 1408 and 1410 and further associated links 1412 and 1414 of pixel 1404 as unbroken, since an edge of the primitive 1400 does not intersect any of the links 1408, 1410, 1412 and 1414. As a result, the link current module 506 outputs a logic "1" signal to indicate that there are no breaks in the links 1408, 1410, 1412 and 1414.

If information stored in the link buffer 504 indicates that edges of a previously rendered primitive 1416 do not cross the links 1408, 1410, 1412 and 1414, the previous link status module 508 outputs a logic "1" signal to indicate that there are no breaks in the links 1408, 1410, 1412 and 1414. In response to the logic "1" output signals from the link status modules 506 and 508, the unchanged link module 510 (FIG. 5) will enable a Z value of the pixel 1402 to be stored and rendered in an area of the coarse Z buffer 202 (FIG. 2) and the color value of the pixel 1402 to be stored and rendered in an area of the coarse color buffer 204 (FIG. 2). Supersampling is not performed in this example. Further, it should be noted that the current link status module 506 checks if breaks occur in other links in the link grid overlapping the current primitive 1400, while the previous link status module 508 checks if breaks have occurred in links due to edges of the previously rendered primitive 1416.

Figure 15:
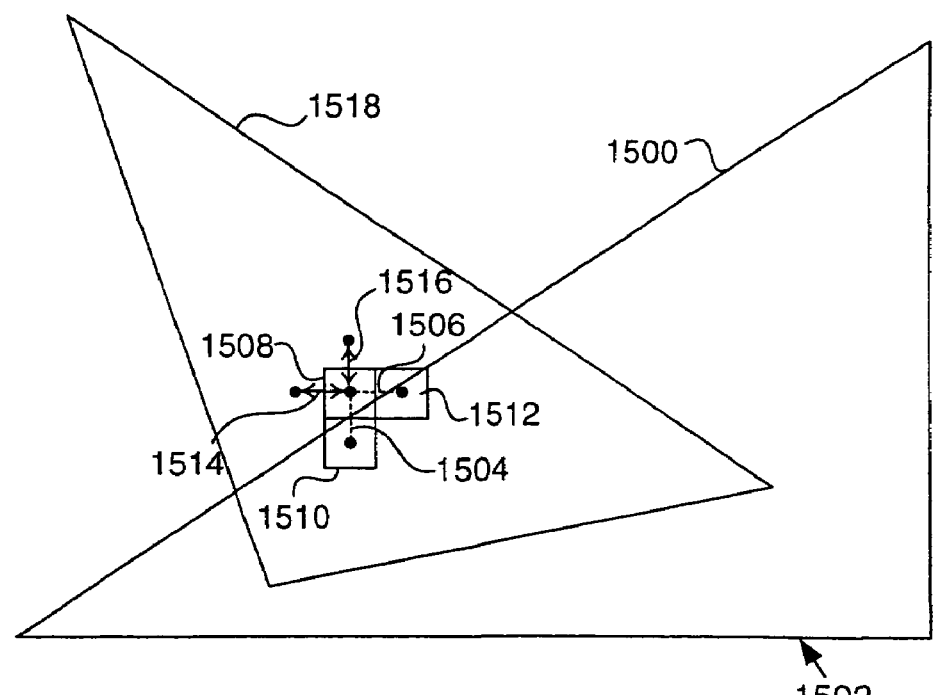
FIG. 15 is a diagram illustrating links broken by an edge of a primitive.

FIG. 15 is an exemplary embodiment illustrating an edge 1500 of a current unoccluded primitive 1502 breaking link 1504 located between center points of pixels 1508 and 1510 and link 1506 located between center points of pixels 1508 and 1512 (case 1). Thus, the current link status module 506 (FIG. 5) detects the links 1504 and 1506 as broken. As a result, the current link status module 506 outputs a logic "0" signal to indicate breaks in the links 1504 and 1506 by the current primitive 1502. It should be noted that links 1514 and 1516 are not broken by the edges of the current primitive 1502.

If information stored in the link buffer 504 (FIG. 5) indicate that edges of a previously rendered primitive 1518 do not cross the links 1504, 1506, 1514 and 1516, the previous link status module 508 (FIG. 5) outputs a logic "1" signal. In response to the logic "0" output signal from the current link status module 506 and the logic "1" output signal from the previous link status module 508, a the broken link module 514 will interpolate the Z value for the current primitive portion that projects to sub-pixel points corresponding to the pixel 1508. The Z value is then stored and rendered in an area of the fine Z buffer 210 (FIG. 2). The broken link module 514 will also interpolate the color value for the current primitive portion that projects to sub-pixel points corresponding to the pixel 1508. The color value is subsequently stored and rendered in an area of the fine color buffer 212 (FIG. 2).

The pixel 1508 is super-sampled at a predefined resolution or sampling grid pattern (e.g., FIG. 3 or 4). The Z values at the sub-pixel locations defined in pixel 1508 are stored in the fine Z buffer 210, and are used subsequently for Z comparison at sub-pixel resolution further down the graphics pipeline. The computed texture values involve texture coordinate generation and texture filtering. The texture filtered values are stored in the fine color buffer 212 and the sub-pixel colors are blended to obtain the final pixel color. The Z information stored in the fine Z buffer are Z values determined by use of conventional linear interpolation. Each Z value may be expressed by the conventional linear function Z(x,y) where the coordinates (x,y) are position coordinates of the point being super-sampled.

Figure 16:
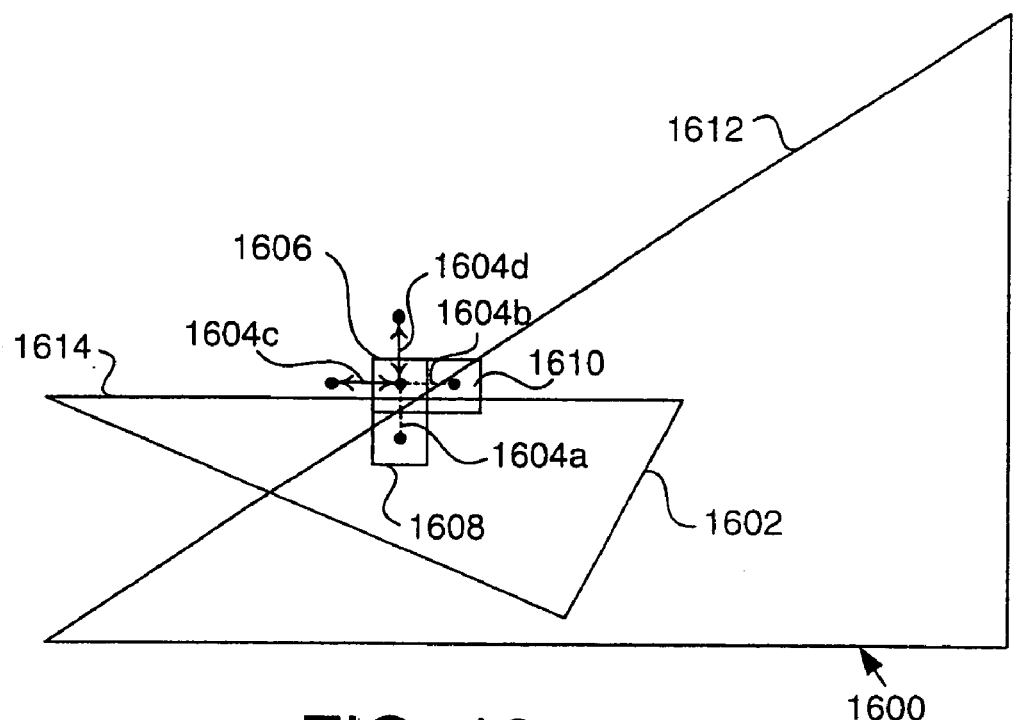
FIG. 16 is a diagram illustrating a link broken by an edge of the current primitive and by an edge of a previously rendered primitive.

FIG. 16 illustrates an example of the second case potentially encountered by the edge anti-aliasing module 104 (FIG. 1) where two edges of different primitives 1600 and 1602 break a link or links associated with a particular pixel. Assume that a link 1604a is located between center points of pixels 1606 and 1608. The link 1604a is broken by an edge 1612 of the current primitive 1600 and an edge 1614 of the previously rendered primitive 1602. The current link status module 506 (FIG. 5) detects the breakage of the link 1604a and outputs a logic "0" signal to indicate the break in the link 1604a by the current primitive 1600. Assuming that information stored in the link buffer 504 (FIG. 5) indicates that the edge 1614 of the previously rendered primitive 1602 also breaks the link 1604a associated with the pixel 1606, the previous link status module 508 (FIG. 5) outputs a logic "0" signal to indicate a broken link due to the edge 1614 of the previously rendered primitive 1602.

In response to the logic "0" signals from both link status modules 506 and 508, the unchanged broken link module 516 (FIG. 5) will enable a Z value of the pixel 1606 to be stored and rendered in an area of the fine Z buffer 210 (FIG. 2) and the color value of the pixel 1606 to be stored and rendered in an area of the fine color buffer 212 (FIG. 2). The pixel 1606 is super-sampled at a pre-defined resolution or sampling grid pattern (as described in connection with FIGS. 3 and 4). The Z values at the sub-pixel locations defined in the pixel 1606 are stored in the fine Z buffer 210, and are subsequently used for Z comparison further down the graphics pipeline. It should be noted that computer texture values involve texture coordinate generation and texture filtering. These texture filtered values are stored in the fine color buffer 212, and the sub-pixel colors are then blended to obtain the final pixel color prior to display.

Other pixels with associated links broken by an edge of the current primitive 1600 are also super-sampled and processed in the same manner described above. Subsequently, the link buffer 504 is updated.

Figure 17:
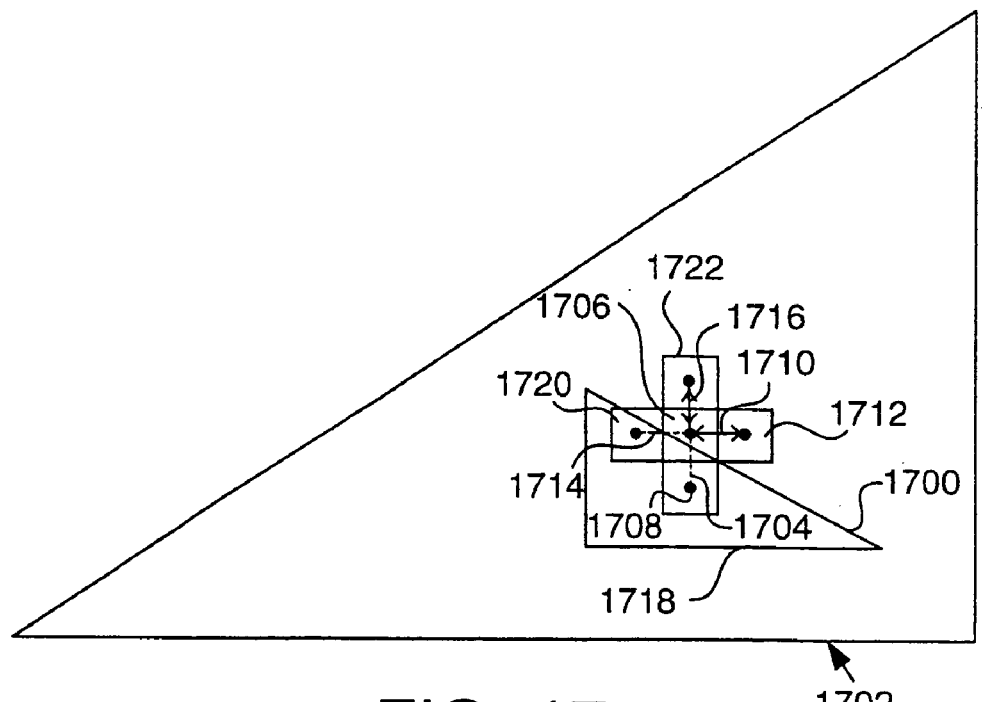
FIG. 17 is a diagram illustrating a link unbroken by an edge of a current primitive and broken by an edge of a previously rendered primitive.

FIG. 17 illustrates an example of the third case encountered by the edge anti-aliasing module 104 (FIG. 1) where a previously rendered edge 1700 is occluded by a current polygon 1702. Assume that a link 1704 is between center points of pixels 1706 and 1708, and that a link 1710 is between center points of pixels 1706 and 1712. The current link status module 506 (FIG. 5) detects the links 1704 and 1710 and further links 1714 and 1716 as not broken by edges of the current primitive 1702. As a result, the current link status module 506 outputs a logic "1" signal indicating no breaks in the links 1704, 1710, 1714 and 1716 by the current primitive 1702.

Assume further that information stored in the link buffer 504 (FIG. 5) indicates that the edge 1700 of a previously rendered primitive 1718 crosses one or more links associated with the pixel 1706. This indication results in the previous link status module 508 (FIG. 5) outputting a logic "0" signal to indicate a broken link. In the exemplary embodiment of FIG. 17, the edge 1700 breaks the links 1704 and 1714. In response to the logic "1" signal form the current link status module 506 and the logic "0" output signal from the previous link status module 508, the comparison module 512 (FIG. 5) will enable the Z comparison of every subpixel corresponding to pixel 1706 and associated pixels 1708, 1712, 1720 and 1722. If all subpixels corresponding to the pixels 1706, 1708, 1712, 1720 and 1722 pass a Z value comparison test preformed by the comparison module 512 (FIG. 5), it can be inferred that a current primitive's contribution to the pixel 1706 is such that all previously rendered primitives at pixel 1706 have been occluded. As a result, the comparison module 512 will enable the current color and Z values of pixel 1706 to be rendered and stored in the coarse Z buffer 202 (FIG. 2) and the coarse color buffer 204 (FIG. 2). In the event that one of the subpixels corresponding to pixels 1706, 1708, 1712, 1720 and 1722 fails the Z value comparison test, pixel 1706 is designated as an edge pixel and is rendered with the fine Z buffer 210 and fine color buffer 212.

The comparison module 512 also updates the link buffer 504 after the Z value comparison is completed. The comparison module 512 then reconnects links between pairs of pixels that pass the Z value comparison test at the subpixel level. Additionally, the comparison module 512 frees the fine Z buffer 210 and the fine color buffer 212 for the purpose of storing super-sampled values of edge pixels when the subsequent primitives are rendered. The ability to detect occlusions of previous super-sampled pixels facilitates the use of dynamic memory allocations for the fine Z buffer 210 and fine color buffer 212, which leads to an efficient use of limited memory resources.

Edge Anti-Aliasing by Use of Supersampled Coverage Masks

Figure 18:
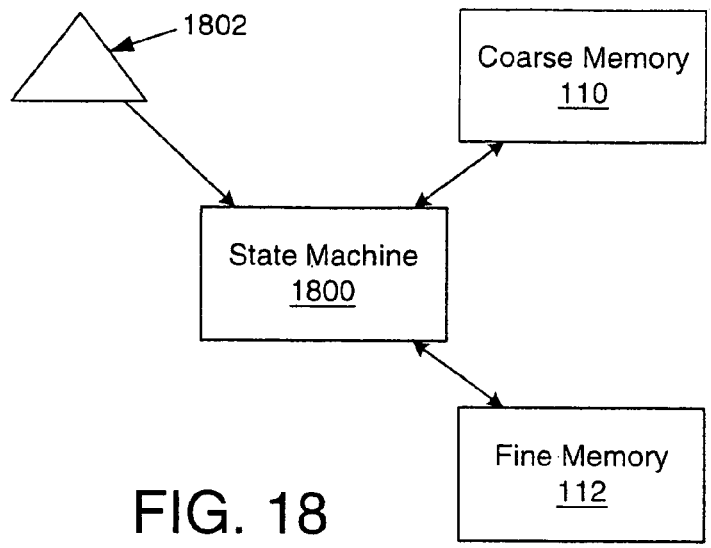
FIG. 18 is a block diagram of an edge anti-aliasing module in accordance with another embodiment of the present system and method.

FIG. 18 is a block diagram of an alternative embodiment of an edge anti-aliasing module 1800. The edge anti-aliasing module 1800 is preferably a state machine implemented in hardware. The edge anti-aliasing module 1800 receives current primitive data 1802 as well as buffered data from the coarse memory 110 (FIG. 1). The edge anti-aliasing module 1800 also updates new state information in the coarse memory 110 as described in further detail below. Additionally, the edge anti-aliasing module 1800 functions with the fine memory 112 (FIG. 1) and sends pixel data to the fine memory 112 for each edge that needs to be super-sampled.

The edge anti-aliasing module 1800 applies a pre-specified sampling grid for each current primitive data 1802. The pre-specified grid is preferably the same grid used for super-sampling as described in the exemplary embodiments of FIGS. 3 and 4. The pre-specified sampling grid is formed by a plurality of subsample coverage masks, with subsample coverage being generated for every pixel. Each mask has additional information of "1" or "0" based on whether the subsample is inside or outside the primitive.

Geometry Edge Detection

Figure 19:
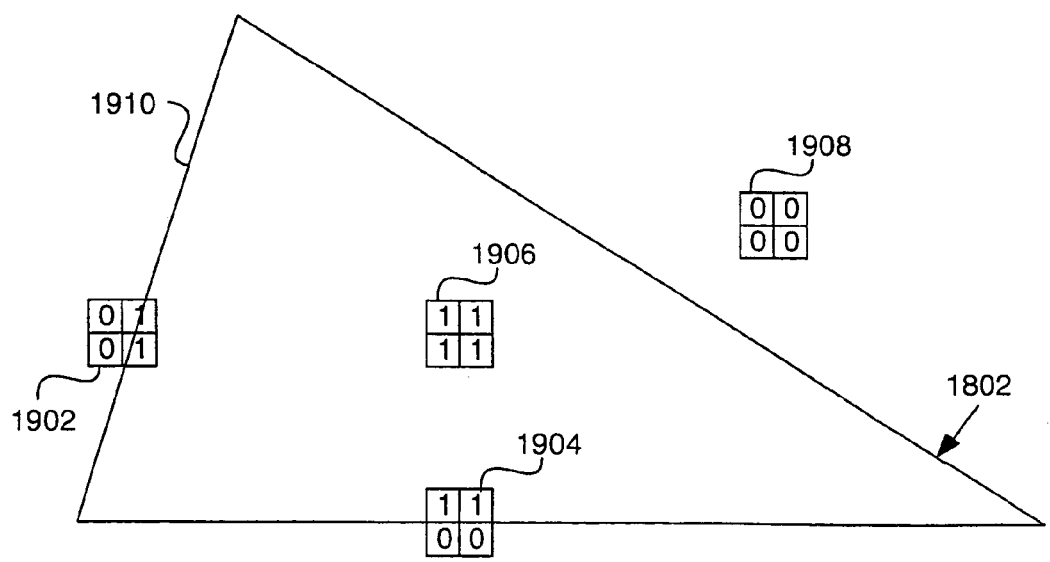
FIG. 19 is a diagram illustrating a method of detecting "geometry edges" by use of subsample coverage masks, according to the present system and method.

To assist in explaining the functionality of the present system and method and to avoid overcrowding FIG. 19, only subsample coverage masks 1902, 1904, 1906 and 1908 are shown for the pre-specified sampling grid. However, it is understood that the pre-specified sampling grid includes other masks.

In the exemplary embodiment shown in FIG. 19, each of the masks 1902, 1904, 1906 and 1908 stores four (4) bits of information since each mask corresponds to a pixel and is divided into 2×2 sub-pixels. Alternatively, each pixel may be divided into other sub-pixel sizes (e.g., 4×4 sub-pixels). Each sub-pixel in a mask holds one bit of information. Thus, if a sub-pixel falls outside of a primitive, the sub-pixel will have a bit value of "0". Alternatively, if a sub-pixel falls inside of a primitive, the sub-pixel will have a bit value of "1". Further, if a bit value of sub-pixels of a mask are not the same, then the corresponding pixel is detected as falling on an edge of the current primitive. Thus, the bit value of the sub-pixels of mask 1902 will indicate the presence of an edge 1910 of the current primitive 1802.

The mask 1906 is detected as falling inside the current primitive 1802, since each sub-pixel of the mask 1906 has the same bit value (i.e., "1" bit value). Similarly, the mask 1908 is detected as falling outside the current primitive 1802 because each sub-pixel of the mask 1908 has the same bit value (i.e., "0" bit value). Other masks (not shown) detect other portions of edges of the current primitive 1802. The bit values for detecting whether a mask falls inside, outside or on an edge of a primitive are determined by use of the f(x,y) function described in connection with FIG. 10 which is dependent on the combination of edge functions $f_1(x,y)$, $f_2(x,y)$ and $f_3(x,y)$.

Z Edge Detection

Figure 20:
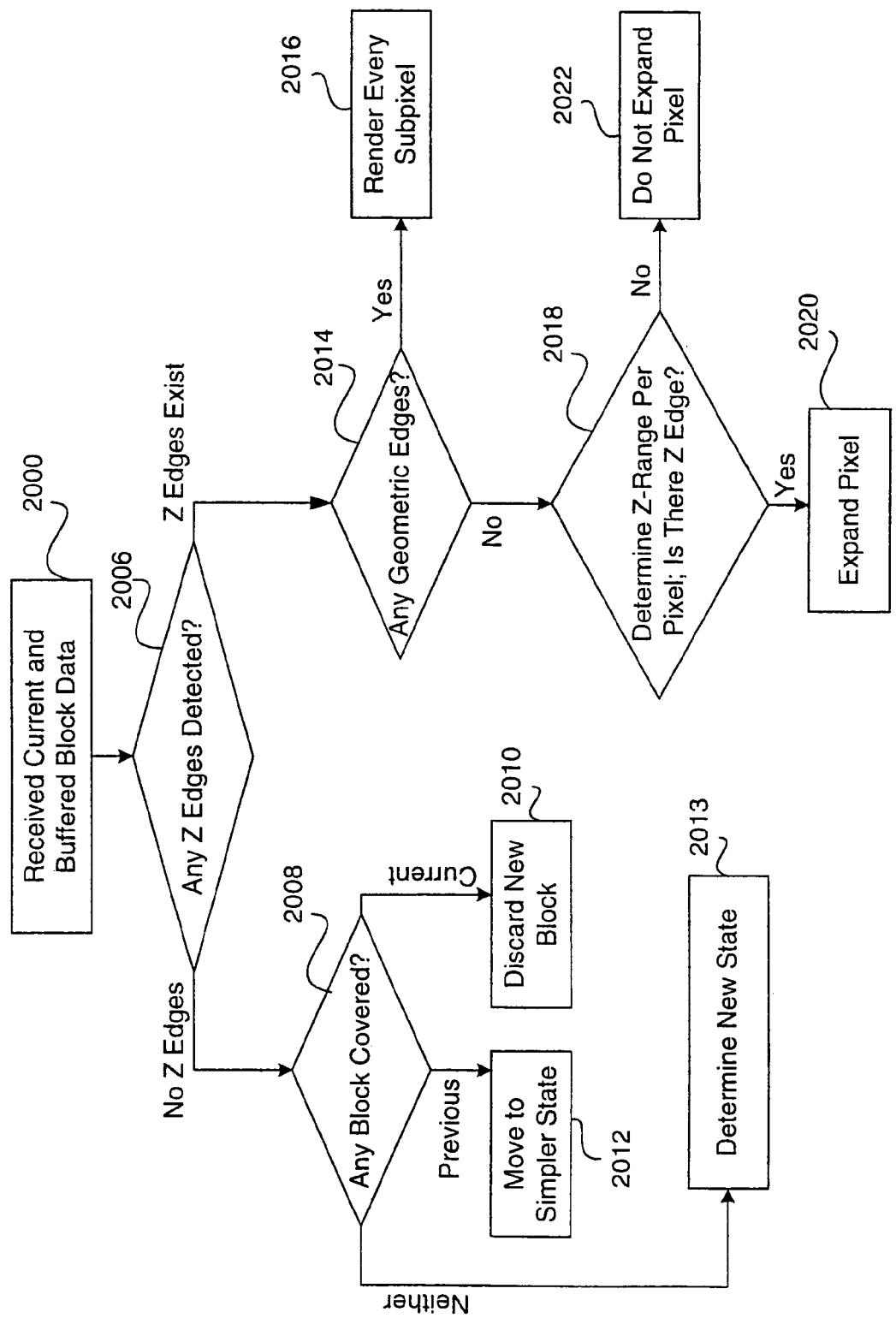
FIG. 20 is a functional block diagram illustrating the operation of the edge anti-aliasing module of FIG. 18.

FIG. 20 is a block diagram describing the function of the edge anti-aliasing module 1800 (FIG. 18). Each step of the block diagram is performed by a module designed for a particular function. For the purpose of this description, assume that $BLOCK_1$ is a pixel (or group of pixels) in a current primitive and that $BLOCK_2$ is a pixel (or group of pixels) that covers the same screen area as $BLOCK_1$, but corresponds to buffered primitives previously rendered in the coarse memory 110 (FIG. 1). Thus, although $BLOCK_1$ and $BLOCK_2$ cover the same screen area, $BLOCK_1$ corresponds to the current primitive while $BLOCK_2$ corresponds to the previously rendered collection of primitives. In step 2000, the edge anti-aliasing module 1800 receives current and buffered block data. Subsequently, a Z edge detection module determines whether any Z edges exist in step 2006. If there are no Z edges, then the edge anti-aliasing module 1800 determines if $BLOCK_1$ or $BLOCK_2$ is covered in step 2008. Should $BLOCK_1$ (current) be covered, then the edge anti-aliasing module 1800 will discard the new block. Alternatively, if $BLOCK_2$ (buffered previous), is covered, then the edge anti-aliasing module 1800 will move to a simpler state in step 2012. If neither $BLOCK_1$ nor $BLOCK_2$ is covered, then the edge anti-aliasing module 1800 will determine a new state, step 2013.

If in step 2006, the Z edge detection module detects Z edges, then in step 2014, a geometric edge detection module determines if any geometric edges exist. If geometric edges do exist, then every pixel is rendered in step 2016. Alternatively if no geometric edges are detected, a Z range per pixel is determined and another module determines if there are Z edges in step 2018. In step 2022, pixels are not expanded if there are no Z edges, while pixels are expanded if Z edges exist (step 2020).

Figure 21:
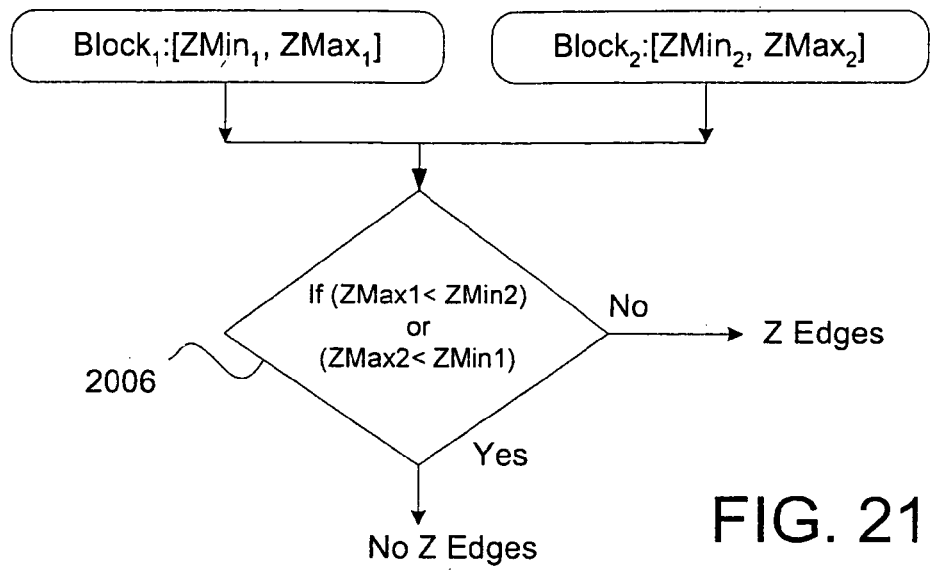
FIG. 21 is a block diagram illustrating the operation of the Z edge detection module of FIG. 19.

FIG. 21 is a more detailed illustration of the Z edge detection step 2006 (FIG. 20). In step 2006, the Z edge detection module compares the following Z values: "$Zmin_1$" (the minimum Z value of the primitive block $BLOCK_1$), "$Zmax_1$" (the maximum Z value of the primitive block $BLOCK_1$), "$Zmin_2$" (the minimum Z value of the primitive block $BLOCK_2$), and "$Zmax_2$" (the maximum Z value of block $BLOCK_2$). The Z edge detection module checks for the conditions shown below:

$$(Zmax_1 < Zmin_2) \text{ or } (Zmax_2 < Zmin_1) \quad (1)$$

If $(Zmax_1 < Zmin_2)$ or $(Zmax_2 < Zmin_1)$ is satisfied, then the edge detection module will indicate that no "Z edge" exists. If neither condition is satisfied, then the edge detection module will indicate that a "Z edge" exists.

Figure 22A:
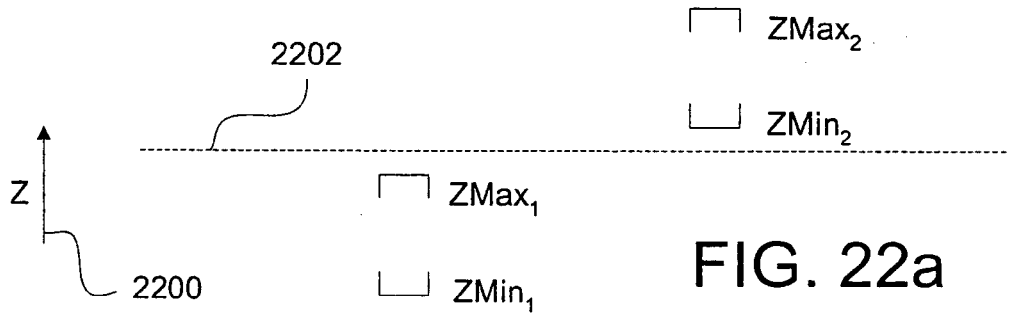
FIG. 22A is a diagram illustrating an example of Z range values where no "Z edge" arises when $ZMax_1 < ZMin_2$.
Figure 22B:
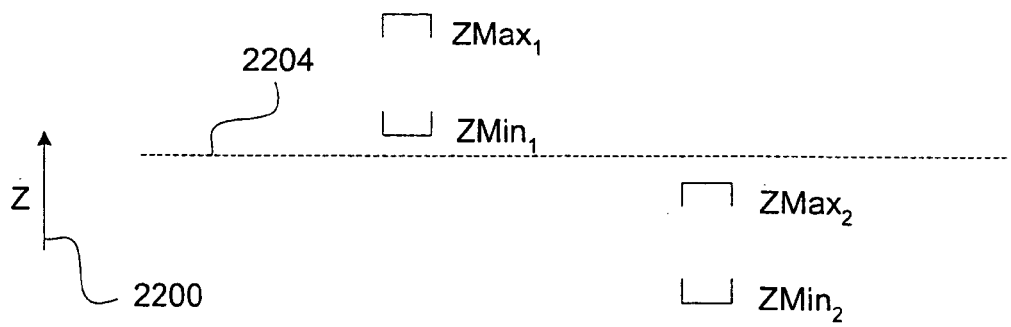
FIG. 22B is a diagram illustrating an example of Z range values where no "Z edge" arises when $ZMax_2 < ZMin_1$.

FIGS. 22a and 22b are diagrams illustrating an operation of the Z edge detection step 2006 (FIG. 21) for exemplary cases when no "Z edge" exists. In FIG. 22a, no "Z edge" exists because of a condition $Zmax_1 < Zmin_2$. A reference Z value 2202 is provided to clearly illustrate that $Zmin_2$ has a greater value than $Zmax_1$. The Z value increases vertically upwards as shown by Z axis 2200. Alternative, FIG. 22b shows a no "Z edge" case based on a condition $Zmax_2 < Zmin_1$. A reference Z value 2204 clearly indicates that $Zmin_1$ has a greater value than $Zmax_2$.

Figure 23A:
FIG. 23A is a diagram illustrating an example of Z range values where a "Z edge" arises when $ZMax_1 < ZMin_2$ is not satisfied.
Figure 23B:
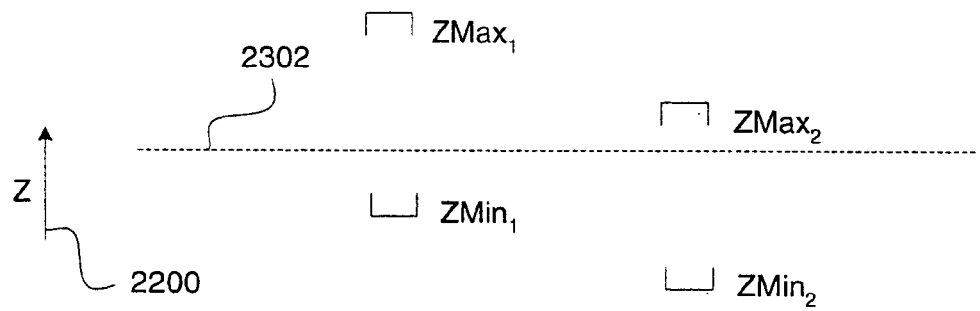
FIG. 23B is a diagram illustrating an example of Z range values where a "Z edge" arises when $ZMax_2 < ZMin_1$ is not satisfied.

FIGS. 23a and 23b are diagrams showing an operation of the Z edge detection step 2006 (FIG. 21) for exemplary "Z edge" cases. In FIG. 23a, a "Z edge" exists because a condition $Zmax_1 < Zmin_2$ is not satisfied. A reference Z value 2300 is shown to clearly indicate that $Zmax_1 > Zmin_2$ and $Zmax_2 > Zmin_1$. Alternatively, FIG. 23b illustrates an exemplary case when a condition $Zmax_2 < Zmin_1$ is not satisfied resulting in a "Z edge". $Zmax_2 > Zmin_1$ and $Zmax_1 > Zmin_2$ is indicated by a reference Z value 2302.

Referring back to FIG. 20, if step 2006 determines that a "Z edge" exists (denoted as "Range intersects"), the module in step 2014 determines if $BLOCK_1$ has a "geometric edge" of if $BLOCK_2$ had been previously super-sampled. If $BLOCK_1$ does not have a "geometric edge" and $BLOCK_2$ was not previously super-sampled, then a module in step 2018 determines a Z-range per pixel and checks if there is a Z edge based upon the Z-range. If there is a Z edge, then the current primitive $BLOCK_1$ is super-sampled. Alternatively, if there is no Z-edge, $BLOCK_1$ is not super-sampled.

Edge Processing by Edge Anti-Aliasing Module 1800

As shown in FIG. 20, the incoming primitives are processed one block at a time. The size of the block can vary with the nature of the implementation. For example, if a block covers an area of 2×2 pixels, data stored in the coarse memory 110 (FIG. 1) will correspond to groups of 2×2 pixels. With each buffered block stored in the coarse memory 110, there is an associated "state" of the buffered block. These states change as dictated by logic included in the state machine 1800 (FIG. 18). Subsequently, all state changes that occur are updated in the coarse memory 110.

Referring now to a state diagram 2400 of FIG. 24 and corresponding states shown in succeeding FIGS. 25–29, the edge processing operation of the edge anti-aliasing module 1800 (FIG. 18) is described below. As is necessary for any state machine, one has to identify an initial state or "POWER ON" state. For purposes of this discussion, the initial state stored in the coarse memory 110 (FIG. 1) is denoted as STATE_0 2402. This indicates that primitive information (corresponding to a particular block of coarse memory 110) has not yet arrived. When the current primitive information does arrive, a block in the initial state transitions 2404 to a state STATE_CCCZ 2406. Such a state change is reported back to the coarse memory 110. In addition to the state information, other information (Z values and color values) relevant to pixels in the current block being processed may be stored in the coarse memory 110. Note that in the state STATE_CCCZ 2406, neither Z values nor color values are super-sampled (such as in the case shown in FIG. 25). Also, super-sampling is not performed for Z values and color values for a block within a primitive (e.g., as shown in block 2602 in FIG. 26).

Figure 24:
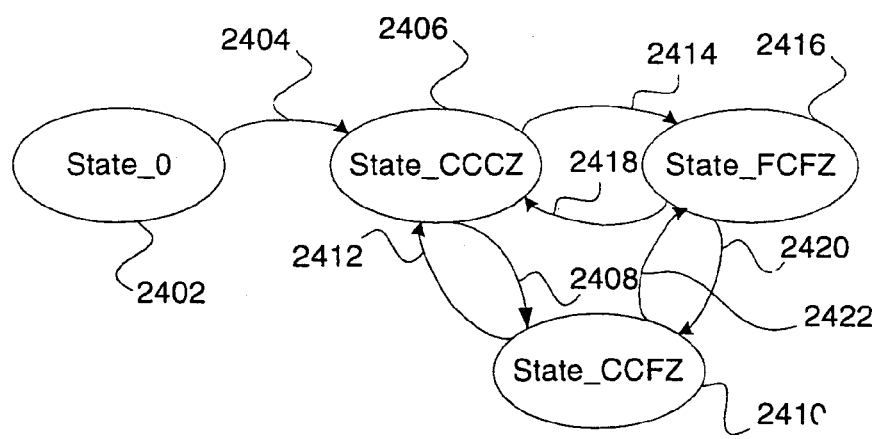
FIG. 24 is a state diagram illustrating the operation of the edge anti-aliasing module of FIG. 18.
Figure 25:
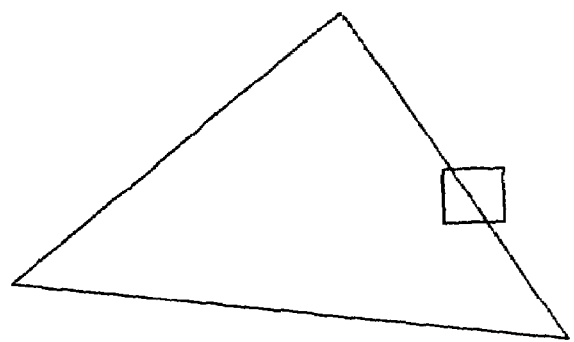
FIG. 25 is a diagram showing a pixel within an interior of a primitive wherein the pixel information is stored in a coarse Z buffer and a coarse color buffer.
Figure 26:
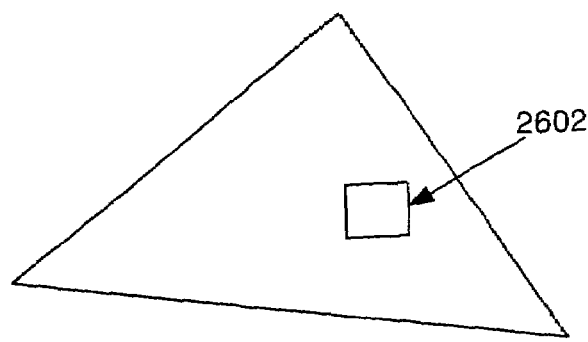
FIG. 26 is a diagram showing a single primitive edge falling on a pixel wherein the pixel information is stored in the coarse Z buffer and the coarse color buffer.
Figure 27:
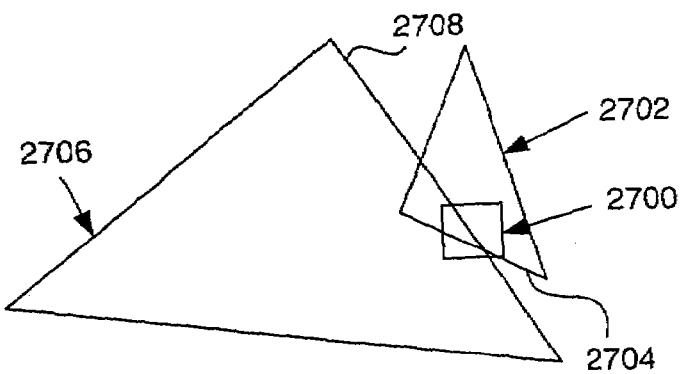
FIG. 27 is a diagram illustrating more than one primitive edge falling on a pixel wherein the pixel information is stored in the coarse color buffer and the fine Z buffer.

The state STATE_CCCZ 2406 can transition 2408 to a state STATE_CCFZ 2410 as shown in FIG. 24. The state STATE_CCFZ 2410 may be triggered by conditions shown in FIG. 27 where edges form more than one primitive fall within a block 2700 and color values of pixels for the current edge is within a predefined threshold. In the exemplary embodiment of FIG. 27, assume that primitive 2702 is a previously rendered primitive with an edge 2704 falling within the block 2700 and that block information on the edge 2704 is stored in the coarse memory buffer 110 (FIG. 18). Further assume that primitive 2706 is a current primitive received by the edge anti-aliasing module 1800 (FIG. 18) and an edge 2708 of the current primitive 2706 also falls within the block 2708. In the state STATE_CCFZ 2410, color information of pixels in block 2700 for current edge 2708 are stored in the coarse color buffer 204 (FIG. 2) and Z information of pixels in block 2700 for current edge 2708 is stored in the fine Z buffer 210 (FIG. 2). As a result, the Z sub-pixel values (for current edge 2708) in block 2700 are computed by the linear interpolation method described previously. It is further noted that the color values of pixels in block 2700 for current edge 2708 are not super-sampled in STATE_CCFZ 2410 because those color values do not differ greatly from the color values of pixels in block 2700 for previously rendered edge 2704.

Figure 28:
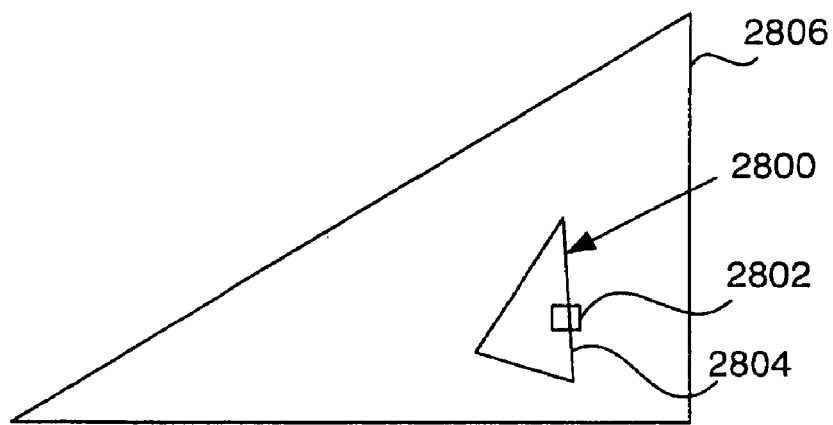
FIG. 28 is a diagram illustrating a previously rendered primitive which is then completely covered by a primitive.

Referring back to FIG. 24, the state STATE_CCFZ 2410 can also transition 2412 to the state STATE_CCCZ 2406. FIG. 28 shows a condition when the transition 2412 can occur. For the purpose of this exemplary embodiment, assume that primitive 2800 is a previously rendered primitive and that pixels in block 2802 were super-sampled for edge 2804. Further assume that a current primitive 2806 is received and covers the previously rendered primitive 2800. Since block 2802 falls in the interior of current primitive 2806, it will not be super-sampled. Thus, non super-sample state STATE_CCCZ 2406 (FIG. 24) is triggered. Subsequently, information for pixels in block 2802 are stored in the coarse Z buffer 202 (FIG. 2) and the coarse color buffer 204 (FIG. 2).

Figure 29:
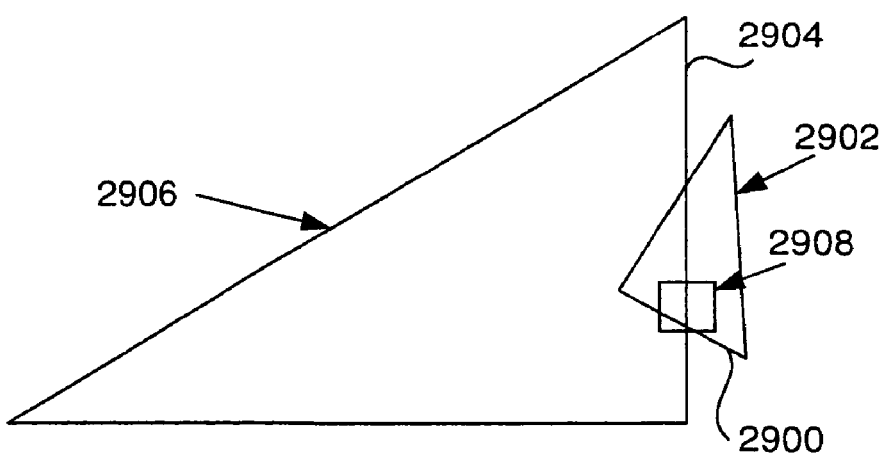
FIG. 29 is a diagram illustrating more than one primitive edge falling on a pixel wherein the pixel information is stored in the fine color buffer and the fine Z buffer.

Once again referring back to FIG. 24, the state STATE_CCCZ 2406 may also transition 2414 to a state STATE_FCFZ 2416. FIG. 29 shows an exemplary embodiment where the transition 2414 can occur. An edge 2900 of a previously rendered primitive 2902 and an edge 2904 of a current primitive 2906 both fall within a block 2908. Z values of pixels in the block 2908 are super-sampled and stored in fine Z buffer 210 (FIG. 2), while color values of pixels in the block 2908 are also super-sampled and stored in fine color buffer 212 (FIG. 2). The state STATE_FCFZ 2416 (FIG. 24) is appropriate when the color contribution to a particular pixel by the current primitive and the previous primitive is outside a predefined threshold level. This is in contrast to the state STATE_CCFZ 2410 (FIG. 24) where the color contribution to a particular pixel is within a predefined threshold.

As further shown in FIG. 24, the state STATE_FCFZ 2416 may transition 2418 to state STATE_CCCZ 2406 so that the Z value and the color value of pixels in a block are not super-sampled. The state STATE_FCFZ 2416 can also transition 2420 to the state STATE_CCFZ 2410 so that the color values of pixels in a block are not super-sampled. Subsequently, the state STATE_CCFZ 2410 can transition 2422 to state STATE_FCCZ 2416 such that the Z values and the color values of pixels in a block are super-sampled.

The selective super-sampling methods described above have various significant advantages. Typically, the memory storage requirement is about 25% to 40% of the memory storage requirement of a full-scene super-sampling method. Thus, the selective super-sampling methods of the present invention can be performed with less memory space as compared to conventional full-scene super-sampling techniques. Secondly, the selective super-sampling methods permit significant reduction in memory traffic. This leads to reduced latency and increased rendering speed, since super-sampling is performed only at the edges of selected primitives. Third, the edge detection and processing is done in such a way that occlusions of edges can be easily detected. This allows for the use of a dynamic memory allocation technique as described above. Fourth, the selective super-sampling methods described herein prevent the occurrence of aliasing artifacts and permit high quality images to be generated.

It is further noted that the methods described herein permit the detection of edges in real time without prior sorting. By avoiding the use of sorting, the above methods overcome the various drawbacks of conventional edge detection methods. It is also within the scope of the present invention to implement a program or code that can be stored in an electronically-readable medium or computer-readable medium to permit a computer to perform any of the methods described herein.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

We claim:

1. A method for preventing aliasing in a current primitive selected for rendering in a display comprising:

detecting an edge; and selectively super-sampling each pixel of a pair of pixels if a link between the pair of pixels is broken by the detected edge.

2. The method of claim 1 wherein the edge is a Z edge.

3. The method of claim 1 wherein the edge is a geometry edge.

4. The method of claim 1 further comprising storing pixel information of the super-sampled pixel in a fine memory.

5. The method of claim 1 further comprising storing pixel information of a non-super-sampled pixel in a coarse memory.

6. The method of claim 1 wherein selectively super-sampling the detected edge comprises:

using a first function (Z1) for calculating Z values of the current primitive for two adjacent screen pixels;

using a second function (Z2) for calculating Z values of a buffered primitive for the two adjacent screen pixels; and determining if there is a Z edge crossing one of the two adjacent screen pixels by determining if signs (Z1–Z2) are different from the two adjacent screen pixels.

7. A method for preventing aliasing in a current primitive selected for rendering in a display comprising:
   detecting an edge;
   selectively super-sampling the detected edge;
   storing information of pixels not super-sampled in a first memory device; and
   storing information of pixels that are super-sampled in a second memory device.

8. The method of claim 7 wherein the edge is a Z edge.

9. The method of claim 7 wherein the edge is a geometry edge.

10. The method of claim 7 wherein the first memory device is a coarse memory and the second memory device is a fine memory.

11. The method of claim 7 wherein detecting the edge comprises using a pre-specified sampling grid to detect the edge.

12. The method of claim 7 wherein detecting the edge comprises evaluating minimum Z values and maximum Z values for a current primitive block and a previously rendered primitive block.

13. The method of claim 7 further comprising block color super-sampling for pixels of a block if more than one edge falls within the block and a color contribution to the block by a current primitive and a previous primitive is within a predefined threshold level.

14. The method of claim 7 wherein detecting an edge comprises determining bit values in a subsample coverage mask corresponding to a pixel to determine the presence of a geometry edge.

15. The method of claim 7 wherein selectively super-sampling comprises determining if the detected edge breaks a link between two pixels and super-sampling the two pixels if the link broken.

16. A machine-readable medium having embodied thereon a program, the program being executable by a machine to perform a method for preventing aliasing in a current primitive selected for rendering in a display, the method comprising:
   detecting an edge; and
   selectively super-sampling each pixel of a pair of pixels if a link between the pair of pixels is broken by the detected edge.

17. The machine-readable medium of claim 16 wherein the method further comprises storing pixel information of the super-sampled pixel in a fine memory.

18. The machine-readable medium of claim 16 wherein the method further comprises storing pixel information of a non-super-sampled pixel in a coarse memory.

19. The machine-readable medium of claim 16 wherein selectively super-sampling the detected edge comprises:
   using a first function (Z1) for calculating Z values of the current primitive for two adjacent screen pixels;
   using a second function (Z2) for calculating Z values of a buffered primitive for the two adjacent screen pixels; and
   determining if there is a Z edge crossing one of the two adjacent screen pixels by determining if signs (Z1–Z2) are different from the two adjacent screen pixels.

* * * * *